(12) United States Patent
Watanabe et al.

(10) Patent No.: US 7,913,089 B2
(45) Date of Patent: Mar. 22, 2011

(54) IDENTIFICATION INFORMATION CREATING APPARATUS, IDENTIFICATION INFORMATION RESOLVING APPARATUS, INFORMATION SYSTEM UTILIZING THE APPARATUSES, CONTROLLING METHOD AND PROGRAM THEREOF

(75) Inventors: Yuji Watanabe, Tokyo (JP); Yoshinori Aoki, Yokohama (JP); Masayuki Numao, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1552 days.

(21) Appl. No.: 10/738,532

(22) Filed: Dec. 17, 2003

(65) Prior Publication Data

US 2004/0205348 A1 Oct. 14, 2004

(30) Foreign Application Priority Data

Dec. 25, 2002 (JP) .................................. 2002-375448

(51) Int. Cl.
*G06F 21/00* (2006.01)
(52) U.S. Cl. ........ 713/182; 713/183; 713/184; 713/185; 713/186; 726/2; 726/43; 726/4; 726/5; 726/6; 726/7; 726/8; 726/9; 726/10; 705/72; 380/43; 380/44
(58) Field of Classification Search .......... 713/182–186; 726/2–10; 705/72; 380/43, 44
See application file for complete search history.

(56) References Cited

U.S. PATENT DOCUMENTS

| | | | | |
|---|---|---|---|---|
| 6,141,421 A * | 10/2000 | Takaragi et al. | ................ | 380/30 |
| 6,959,394 B1 * | 10/2005 | Brickell et al. | ................... | 726/5 |
| 6,996,718 B1 * | 2/2006 | Henry et al. | ................... | 713/182 |
| 6,996,724 B2 * | 2/2006 | Murakami et al. | ............ | 713/193 |
| 7,024,690 B1 * | 4/2006 | Young et al. | ...................... | 726/5 |
| 2001/0029485 A1 * | 10/2001 | Brody et al. | ..................... | 705/39 |
| 2002/0016745 A1 * | 2/2002 | Kuwahara et al. | ............... | 705/26 |
| 2002/0022967 A1 * | 2/2002 | Ohkado | ............................ | 705/1 |
| 2002/0083325 A1 * | 6/2002 | Mediratta et al. | ............. | 713/182 |
| 2002/0116640 A1 * | 8/2002 | Chu | ............................. | 713/201 |

(Continued)

FOREIGN PATENT DOCUMENTS

JP 2002-366527 1/2002

(Continued)

OTHER PUBLICATIONS

Takashi Fujimura, et al., User authentication method, service registration method, authentication card, recording medium for recording service registration/user authentication program, authentication organization device, and service providing device, JP 2002-42102, Translated by: FLS, Inc, pp. 1-52, Jul. 25, 2000.*

(Continued)

*Primary Examiner* — Edan Orgad
*Assistant Examiner* — Canh Le
(74) *Attorney, Agent, or Firm* — Cantor Colburn LLP; Vazken Alexanian

(57) ABSTRACT

An ID creating apparatus includes a derivative value creating unit for creating a derivative value, a user ID encrypting unit for creating encrypted ID by encrypting information including the user ID and the derivative value based on an encryption key, and a derivative ID creating unit for creating derivative ID based on the encrypted ID. An ID resolving apparatus includes an encrypted ID extracting unit for extracting the encrypted ID included in the derivative ID, an encrypted ID decrypting unit for decrypting the encrypted ID based on a decryption key corresponding to the encryption key and thereby creating decrypted ID, and an ID judging unit for determining that the derivative ID is created from the user ID when part of the decrypted ID coincides with information created based on the user ID.

7 Claims, 11 Drawing Sheets

U.S. PATENT DOCUMENTS

| | | | |
|---|---|---|---|
| 2003/0084304 A1* | 5/2003 | Hon et al. | 713/185 |
| 2003/0110401 A1* | 6/2003 | Aoshima et al. | 713/202 |
| 2003/0158960 A1* | 8/2003 | Engberg | 709/237 |
| 2003/0187731 A1* | 10/2003 | Takakura et al. | 705/14 |

FOREIGN PATENT DOCUMENTS

| | | |
|---|---|---|
| JP | 2002-7937 | 2/2002 |
| JP | 2002-42102 | 2/2002 |
| JP | 2002-42102 | 10/2002 |

OTHER PUBLICATIONS

William Stalling, "Cryptography and network Security Principles and Pratice", Second Edition, 1999, 1995 by Prentice-Hall, Inc, Chapter 3 Contention Encryption: Modern techniques, pp. 50-89.*

Mizuki, Takayama, Japanese Publication No. 2002-007937 published on Nov. 1, 2002.

* cited by examiner

IDENTIFICATION INFORMATION CREATING APPARATUS, IDENTIFICATION INFORMATION RESOLVING APPARATUS, INFORMATION SYSTEM UTILIZING THE APPARATUSES, CONTROLLING METHOD AND PROGRAM THEREOF

FIELD OF THE INVENTION

The present invention relates to an identification information creating apparatus, an identification information resolving apparatus, an information system utilizing the apparatuses, a controlling method and a program thereof. More specifically, the present invention relates to an identification information creating apparatus, an identification information resolving apparatus, an information system utilizing the apparatuses, a controlling method and a program thereof, which are capable of efficiently correlating user identification information for identifying a user of an information system with derivative identification information for identifying the same user.

BACKGROUND OF THE INVENTION

Conventionally, an information system utilized by a plurality of users allocates user identification information, which is identification information (hereinafter referred to as "ID") for identifying the users, to the respective users of the information system. Thereafter, a server or the like in the information system manages personal information of each user by correlating the personal information of the user with the relevant user ID.

Along with advances in wide area networks such as the Internet in recent years, various services such as e-mail, auctions, or account management in financial institutions are developed through the wide area network.

For example, Japanese Unexamined Patent Publication No. 2002-7937 discloses an authentication mediation system for managing the user ID which are registered individually for various service sites by use of an authentication mediation server (see Patent reference 1).

(Patent Reference 1)

Japanese Unexamined Patent Publication No. 2002-7937

Along with development in the various services, it is desirable that some of the services are made available by use of different ID which is temporarily provided while concealing the user ID. For example, in Japanese unexamined Patent Publication No. 2002-7937, the user may wish not to register the user ID directly with the authentication mediation server of a highly confidential service site such as a financial institution but to register the different ID, which is accessible only to the relevant service site, for the authentication mediation server. Moreover, for example, it is desired to use the different ID while concealing the original user ID when the user requests for a price estimate of merchandise or sends a complaint about the service, and so forth.

In such cases, when the user registers a new different ID which is not related to the user ID at all with the service site, there arise problems that the personal information needs to be registered redundantly, and that an operation performed by using one of the ID is not reflected in the personal information of the other ID. Accordingly, it is desired to provide an identification information managing method which makes an unauthorized server and the like incapable of distinguishing a connection between the user ID and the different ID issued to the same user while maintaining the connection between the user ID and the different ID.

SUMMARY OF THE INVENTION

Therefore, it is an aspect of the present invention to provide an identification information creating apparatus, an identification information resolving apparatus, an information system utilizing the apparatuses, a controlling method and a program thereof, which can resolve the foregoing problems. This aspect will be achieved by combination of the features as described in the independent claims in the specification. Moreover, the dependent claims in this specification will define further favorable examples of the present invention.

Specifically, a first aspect of the present invention provides an identification information creating apparatus which creates derivative identification information serving as different information to identify a user from user identification information serving as original identification information to identify the user of an information system. Herein, the identification information creating apparatus includes: a derivative value creating unit for creating first and second derivative values which are mutually different data values; a user identification information encrypting unit for creating first encrypted identification information which is encrypted information including the user identification information and the first derivative value based on a predetermined encryption key and for creating second encrypted identification information which is encrypted information including the user identification information and the second derivative value based on the predetermined encryption key; and a derivative information creating unit for creating first derivative identification information based on the first encrypted identification and for creating second derivative identification information based on the second encrypted identification information. The first aspect of the present invention also provides an identification information creating method, a program and a recording medium for realizing the identification information creating apparatus.

A second aspect of the present invention provides an identification information resolving apparatus which judges whether derivative identification information serving as different identification information to identify a user is created from user identification information serving as original identification information to identify the user. The identification information resolving apparatus includes: an encrypted identification information extracting unit for extracting encrypted identification information included in the derivative identification information, in which the encrypted identification information is encrypted based on a predetermined encryption key; an encrypted identification information decrypting unit for decrypting the encrypted identification information based on a decryption key for the encryption key and thereby creating decrypted identification information; and an identification information judging unit for judging that the derivative identification information is created from the user identification information when part of the decrypted identification information coincides with information created based on the user identification information. The second aspect of the present invention also provides an identification information resolving method, a program and a recording medium for realizing the identification information resolving apparatus.

A third aspect of the present invention provides an identification information resolving apparatus which judges whether derivative identification information serving as different identification information to identify a user is created from user identification information serving as original identification information to identify the user. Herein, the identification information resolving apparatus includes: a derivative value creating unit for creating a derivative value serving as a predetermined data value; a user identification information encrypting unit for encrypting information including the user identification information and the derivative value based on a predetermined encryption key and thereby creating encrypted identification information; an expected value creating unit for creating an expected value for the derivative identification information; and an identification information judging unit for judging that the derivative identification information is created from the user identification information when the derivative identification information coincides with the expected value. The third aspect of the present invention also provides an identification information resolving method, a program and a recording medium for realizing the identification information resolving apparatus.

A fourth aspect of the present invention provides an identification information creating apparatus which creates derivative identification information serving as different identification information to identify a user from user identification information serving as original identification information to identify the user of an information system. The identification information creating apparatus includes: a derivative value creating unit for creating first and second derivative values serving as mutually different data values; a user identification information encrypting unit for encrypting information including the user identification information based on a predetermined encryption key and thereby creating encrypted identification information; and a derivative identification information creating unit for creating first derivative identification information including the encrypted identification information and the first derivative value and for creating second derivative identification information including the encrypted identification information and the second derivative value. The fourth aspect of the present invention also provides an identification information creating method, a program and a recording medium for realizing the identification information creating apparatus.

A fifth aspect of the present invention provides an identification information resolving apparatus which judges whether derivative identification information serving as different identification information to identify a user is created from user identification information serving as original identification information to identify the user. The identification information resolving apparatus includes: an encrypted identification information extracting unit for extracting encrypted identification information which is encrypted based on a predetermined encryption key, in which the encrypted identification information is included as part of the derivative identification information; an encrypted identification information decrypting unit for decrypting the encrypted identification information based on a decryption key corresponding to the encryption key and thereby creating decrypted identification information; and an identification information judging unit for judging that the derivative identification information is created from the user identification information when at least part of the decrypted identification information coincides with information created based on the user identification information. The fifth aspect of the present invention also provides an identification information resolving method, a program and a recording medium for realizing the identification information resolving apparatus.

Note that the above-described summary of the invention does not recount all the necessary features of the present invention, and it is to be understood that subcombinations of the above-described group of features may also constitute the present invention.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE INVENTION

Figure 1:
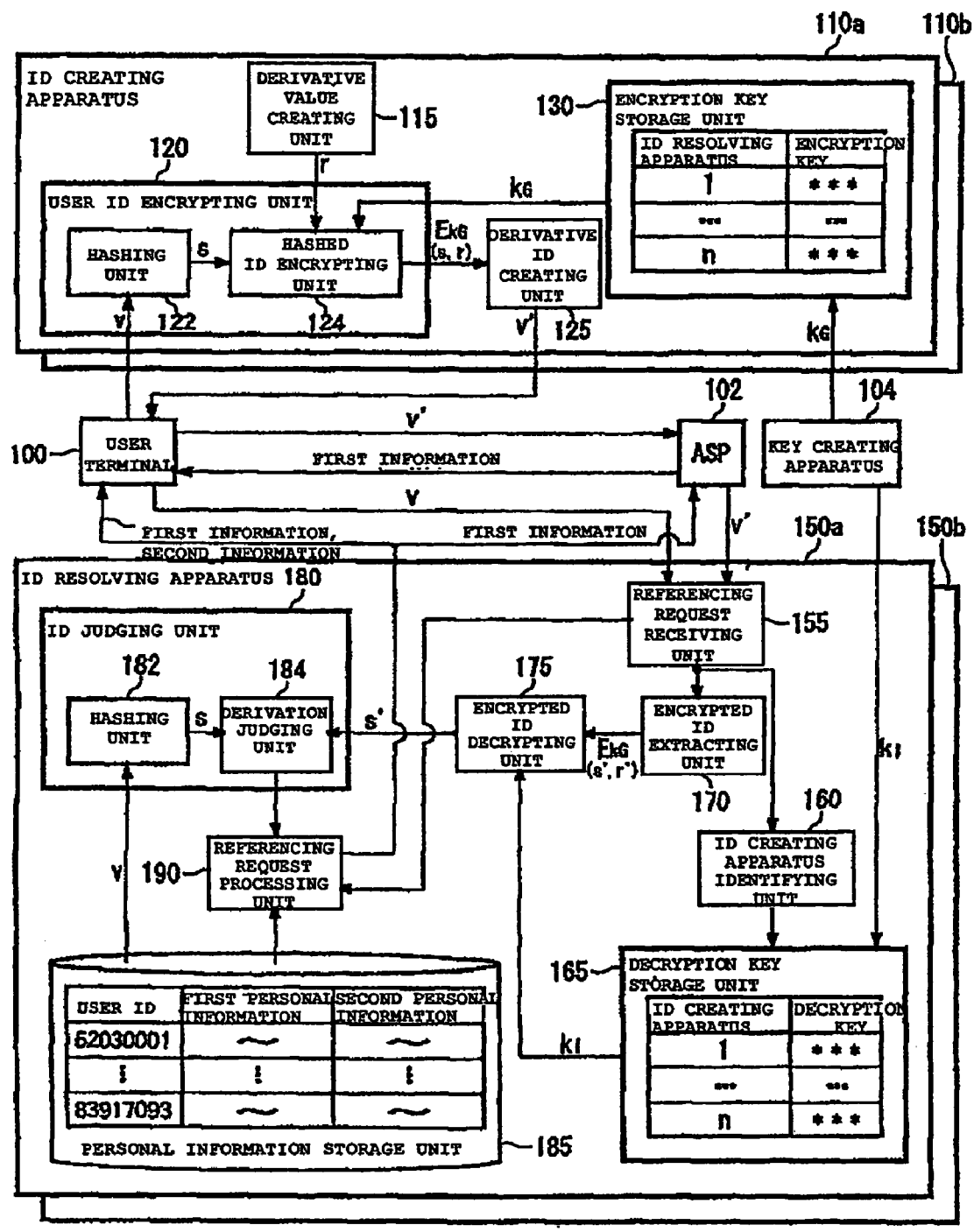
FIG. 1 shows a configuration of an information system 10 according to an embodiment of the present invention.

The present invention provides an identification information creating apparatus, an identification information resolving apparatus, an information system utilizing the apparatuses, a controlling method and a program thereof, which can resolve the foregoing problems. This is achieved by combination of the features as described in the independent claims in the specification. Moreover, the dependent claims in this specification will define further favorable examples of the present invention.

Specifically, a first aspect of the present invention provides an identification information creating apparatus which creates derivative identification information serving as different information to identify a user from user identification information serving as original identification information to identify the user of an information system. Herein, the identification information creating apparatus includes: a derivative value creating unit for creating first and second derivative values which are mutually different data values; a user identification information encrypting unit for creating first encrypted identification information which is encrypted information including the user identification information and the first derivative value based on a predetermined encryption key and for creating second encrypted identification information which is encrypted information including the user identification information and the second derivative value based on the predetermined encryption key; and a derivative information creating unit for creating first derivative identification information based on the first encrypted identification and for creating second derivative identification information based on the second encrypted identification information. The first aspect of the present invention also provides an identification information creating method, a program and a recording medium for realizing the identification information creating apparatus.

The present invention also provides an identification information resolving apparatus which judges whether derivative identification information serving as different identification information to identify a user is created from user identification information serving as original identification information to identify the user. The identification information resolving apparatus includes: an encrypted identification information extracting unit for extracting encrypted identification information included in the derivative identification information, in which the encrypted identification information is encrypted based on a predetermined encryption key; an encrypted identification information decrypting unit for decrypting the encrypted identification information based on a decryption key for the encryption key and thereby creating decrypted identification information; and an identification information judging unit for judging that the derivative identification information is created from the user identification information when part of the decrypted identification information coincides with information created based on the user identification information. The second aspect of the present invention also provides an identification information resolving method, a program and a recording medium for realizing the identification information resolving apparatus.

The present invention also provides an identification information resolving apparatus which judges whether derivative identification information serving as different identification information to identify a user is created from user identification information serving as original identification information to identify the user. Herein, the identification information resolving apparatus includes: a derivative value creating unit for creating a derivative value serving as a predetermined data value; a user identification information encrypting unit for encrypting information including the user identification information and the derivative value based on a predetermined encryption key and thereby creating encrypted identification information; an expected value creating unit for creating an expected value for the derivative identification information; and an identification information judging unit for judging that the derivative identification information is created from the user identification information when the derivative identification information coincides with the expected value. The third aspect of the present invention also provides an identification information resolving method, a program and a recording medium for realizing the identification information resolving apparatus.

The present invention further provides an identification information creating apparatus which creates derivative identification information serving as different identification information to identify a user from user identification information serving as original identification information to identify the user of an information system. The identification information creating apparatus includes: a derivative value creating unit for creating first and second derivative values serving as mutually different data values; a user identification information encrypting unit for encrypting information including the user identification information based on a predetermined encryption key and thereby creating encrypted identification information; and a derivative identification information creating unit for creating first derivative identification information including the encrypted identification information and the first derivative value and for creating second derivative identification information including the encrypted identification information and the second derivative value. The fourth aspect of the present invention also provides an identification information creating method, a program and a recording medium for realizing the identification information creating apparatus.

The present invention still further provides an identification information resolving apparatus which judges whether derivative identification information serving as different identification information to identify a user is created from user identification information serving as original identification information to identify the user. The identification information resolving apparatus includes: an encrypted identification information extracting unit for extracting encrypted identification information which is encrypted based on a predetermined encryption key, in which the encrypted identification information is included as part of the derivative identification information; an encrypted identification information decrypting unit for decrypting the encrypted identification information based on a decryption key corresponding to the encryption key and thereby creating decrypted identification information; and an identification information judging unit for judging that the derivative identification information is created from the user identification information when at least part of the decrypted identification information coincides with information created based on the user identification information. The fifth aspect of the present invention also provides an identification information resolving method, a program and a recording medium for realizing the identification information resolving apparatus.

Note that the above-described summary of the invention does not recount all the necessary features of the present invention, and it is to be understood that subcombinations of the above-described group of features may also constitute the present invention.

Hereinafter, the present invention will be described with a preferred embodiment of the present invention. However, it is to be understood that the embodiments described below are neither limiting the scope of the invention as will be defined in the appended claims nor defining that all the combinations of features described in the embodiments are always essential to the solution according to the invention.

FIG. 1 shows a configuration of an information system 10 according to an embodiment of the present invention. The information system 10 of this embodiment applies user identification information (any type of "identification information" will be hereinafter referred to as "ID"), which is ID for identifying a user of the information system 10, to create derivative ID which is different ID for identifying the user, and then the information system 10 allows the user to use the derivative ID. Herein, only a predetermined apparatus can identify the connection between the created derivative ID and the user ID. On the other hand, an unauthorized server or the like cannot identify the connection between the user ID and the derivative ID. As a result, the user can utilize the information system 10 by use of the derivative ID while concealing the user ID which is the original ID.

The information system 10 includes: a user terminal 100 used by the user of the information system 10; an application service provider (ASP) 102 which provides a service to the user terminal 100; a key creating apparatus 104 for creating an encryption key and a decryption key; ID creating apparatuses 110*a* and 110*b* for creating the derivative ID based on the user ID; and ID resolving apparatuses 150*a* and 150*b* for identifying the connection between the user ID and the derivative ID and thereby providing personal information on the user of the user ID and the derivative ID.

The user terminal 100 transmits the user ID, which is registered with the ID resolving apparatus 150a or 150b, to the ID creating apparatus 110a or 110b based on an instruction by the user and thereby requests creation of the derivative ID. Next, the user terminal 100 register the derivative ID, which is created by the ID creating apparatus 110a or 110b based on the user ID, with the ASP 102. The ASP 102 obtains the personal information of the user, which is retained by the ID resolving apparatus 150a or 150b, by use of the registered derivative ID. Thereafter, the ASP 102 provides a service. For example, the personal information registered with both ID resolving apparatuses 150a and 150b is arranged to be displayed as a list.

The key creating apparatus 104 creates the encryption key used by the ID creating apparatuses 110a and 110b when creating the derivative ID from the user ID, and transmits the encryption key to the ID creating apparatuses 110a and 110b. Meanwhile, the key creating apparatus 104 creates the decryption key used by the ID resolving apparatuses 150a and 150b when identifying the connection between the user ID and the derivative ID, and transmits the decryption key to the ID resolving apparatuses 150a and 150b.

Upon receipt of the request from the user terminal 100, each of the ID creating apparatuses 110a and 110b creates the derivative ID which is the different ID for identifying the user, from the user ID which is the original ID for identifying the user of the information system 10, and transmits the derivative ID to the user terminal 100.

The ID creating apparatus 110a includes a derivative value creating unit 115, a user ID encrypting unit 120, a derivative ID creating unit 125 and an encryption key storage unit 130. Since the ID creating apparatus 110b has a similar configuration to the ID creating apparatus 110a, description thereof will be omitted herein.

The derivative value creating unit 115 creates a derivative value, data value determined to select the derivative ID which should be created from the user ID. The user ID encrypting unit 120 creates encrypted ID by encrypting information including the user ID and the derivative value based on the encryption key which is predetermined by the key creating apparatus 104 and registered with the encryption key storage unit 130. The user ID encrypting unit 120 includes a hashing unit 122 for converting the user ID into hashed ID having a data length shorter than the user ID by use of a predetermined hash function, and a hashed ID encrypting unit 124 for encrypting information including the hashed ID and the derivative value and thereby creating the encrypted ID based on the encryption key registered with the encryption key storage unit 130. The derivative ID creating unit 125 creates the derivative ID based on the encrypted ID. The encryption key storage unit 130 stores the encryption key corresponding to the decryption key retained by each of the ID resolving apparatus 150a and 150b.

Each of the ID resolving apparatuses 150a and 150b retains the personal information of the user by correlating the personal information with the user ID for identifying the user. Moreover, the ID resolving apparatus 150a or 150b provides the corresponding personal information when provision of the personal information is requested from the user terminal 100 or the ASP 102 by use of the user ID or the derivative ID. Herein, in the case where provision of the personal information is requested by use of the derivative ID, each of the ID resolving apparatuses 150a and 150b judges whether the derivative ID is created from each of the plurality of user ID retained by the ID resolving apparatus 150. In this way, the ID resolving apparatus 150 identifies the connection between the user ID and the derivative ID.

The ID resolving apparatus 150a includes a referencing request receiving unit 155, an ID creating apparatus identifying unit 160, a decryption key storage unit 165, an encrypted ID extracting unit 170, an encrypted ID decrypting unit 175, an ID judging unit 180, a personal information storage unit 185, and a referencing request processing unit 190. Since the ID resolving apparatus 150b adopts a similar configuration to the ID resolving apparatus 150a, a description thereof will be omitted herein.

The referencing request receiving unit 155 receives a referencing request for requesting reference to the personal information of the user. The ID creating apparatus identifying unit 160 identifies the ID creating apparatus 110 which created the derivative ID based on the derivative ID included in the referencing request. The decryption key storage unit 165 stores the decryption key corresponding to the encryption key retained by each of the ID creating apparatus 110a and 110b. In other words, the decryption key storage unit 165 stores the decryption key used for decrypting the derivative ID, which is created by the ID creating apparatus 110 by use of the encryption key corresponding to the ID resolving apparatus 150a by correlating the decryption key with the encryption key retained by each of the ID creating apparatuses 110a and 110b.

The encrypted ID extracting unit 170 extracts the encrypted ID, which is included in the derivative ID and encrypted by the ID creating apparatus 110 that created the derivative ID based on the predetermined encryption key. The encrypted ID decrypting unit 175 obtains the decryption key corresponding to the encryption key for the ID creating apparatus 110 which created the derivative ID, decrypts the encrypted ID based on the decryption key, and thereby creates decrypted ID. The ID judging unit 180 determines that the derivative ID is created from the user ID when part of the decrypted ID coincides with information created based on any of the user ID stored in the personal information storage unit 185. The ID judging unit 180 includes a hashing unit 182 for converting the user ID into hashed ID having a data length shorter than that of the user ID by use of the same hash function used in the hashing unit 122, and a derivation judging unit 184 for determining that the derivative ID is created from the user ID when part of the derivative ID coincides with the hashed ID.

The personal information storage unit 185 stores first and second personal information of the corresponding user by correlating the personal information with the user ID.

The referencing request processing unit 190 selects the personal information to be provided, based on whether the referencing request received by the referencing request receiving unit 155 is the referencing request authenticated by the user ID or is the referencing request authenticated by the derivative ID. In this embodiment, the first personal information is the personal information having relatively low confidentiality and provided in response to both the referencing request authenticated by the user ID and the referencing request authenticated by the derivative ID. On the contrary, the second personal information is the personal information having relatively high confidentiality and provided in response to the referencing request authenticated by the user ID but to the referencing request authenticated by the derivative ID.

Figure 2:
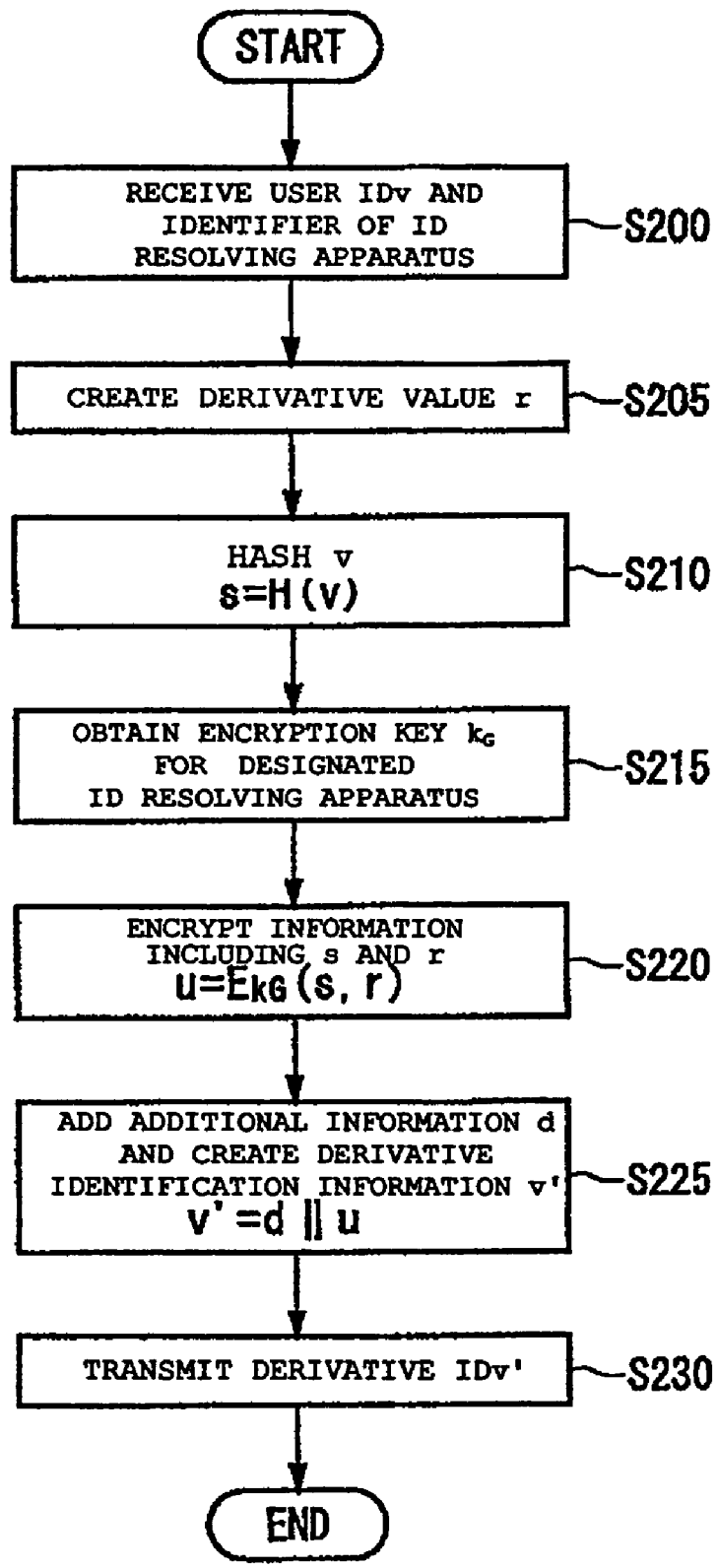
FIG. 2 shows identification information creating processing of an ID creating apparatus 110a according to the embodiment.

FIG. 2 shows identification information creating processing of the ID creating apparatus 110a according to the embodiment of the present invention. First, the hash converting unit 122 receives a derivative ID creation request, which is a request for creating the derivative ID from the user terminal 100. In this event, the user ID encrypting unit 120 receives the user ID and an identifier of the ID resolving apparatus 150 to identify the connection between the user ID and the derivative ID (S200). Next, the derivative value creating unit 115 creates the derivative value, the data value determined to select the derivative ID which should be created from the user ID (S205). Subsequently, the hashing unit 122 converts the user ID into the hashed ID having the data length shorter than that of the user ID by use of the predetermined hash function (S210).

Next, the hashed ID encrypting unit 124 obtains the encryption key corresponding to the decryption key from the encryption key storage unit 130. The decryption key is retained by the ID resolving apparatus 150 identified by the identifier of the ID resolving apparatus 150 received in Step S200 (S215). Next, the hashed ID encrypting unit 124 creates the encrypted ID by encrypting the information including the hashed ID and the derivative value based on the encryption key obtained in Step S215 (S220).

Next, the derivative ID creating unit 125 creates the derivative ID based on the encrypted ID (S225). To be more precise, the derivative ID creating unit 125 creates the derivative ID by adding additional information, which includes information such as the identifier of the ID creating apparatus 110a which created the derivative ID and the identifier of the ID resolving apparatus 150 capable of identifying the connection between the derivative ID and the user ID, to the encrypted ID. Herein, the derivative ID creating unit 125 may also include information on an identifier for indicating an organization or the like which issued the relevant ID, an ID type number indicating that the ID is either the user ID or the derivative ID, an encryption method of the ID, an identifier for identifying the range of the personal information which can be referenced by the relevant ID, and the like in the additional information. Next, the derivative ID creating unit 125 transmits the created derivative ID to the user terminal 100 (S230).

In the above-described processing, the ID creating apparatus 110a can create a plurality of derivative ID from one piece of user ID by changing the derivative value created in Step S205. In other words, in Step S205, the derivative value creating unit 115 creates first and second derivative values which are mutually different data values. Meanwhile, in Step S220, the hashed ID encrypting unit 124 creates first encrypted ID by encrypting information including the hashed ID and the first derivative value and second encrypted ID by encrypting information including the hashed ID and the second derivative value. Thereafter, in Step S225, the derivative ID creating unit 125 creates first derivative ID which includes the first encrypted ID and the additional information, and second derivative ID which includes the second encrypted ID and the additional information.

As described above, the ID creating apparatus 110a creates the derivative ID by use of the encryption key which corresponds to the decryption key retained by either the ID resolving apparatus 150a or the ID resolving apparatus 150b designated by the user terminal 100. In this way, the ID creating apparatus 110a creates the derivative ID from which only the ID resolving apparatus retaining the corresponding decryption key can identify the connection with the user ID. Therefore, the ASP 102 or the ID resolving apparatus 150 without the corresponding decryption key cannot identify which user ID the derivative ID has the connection with. In this way, the user can utilize the information system 10 by use of the derivative ID while concealing the user ID which is the original ID of the user.

Figure 3:
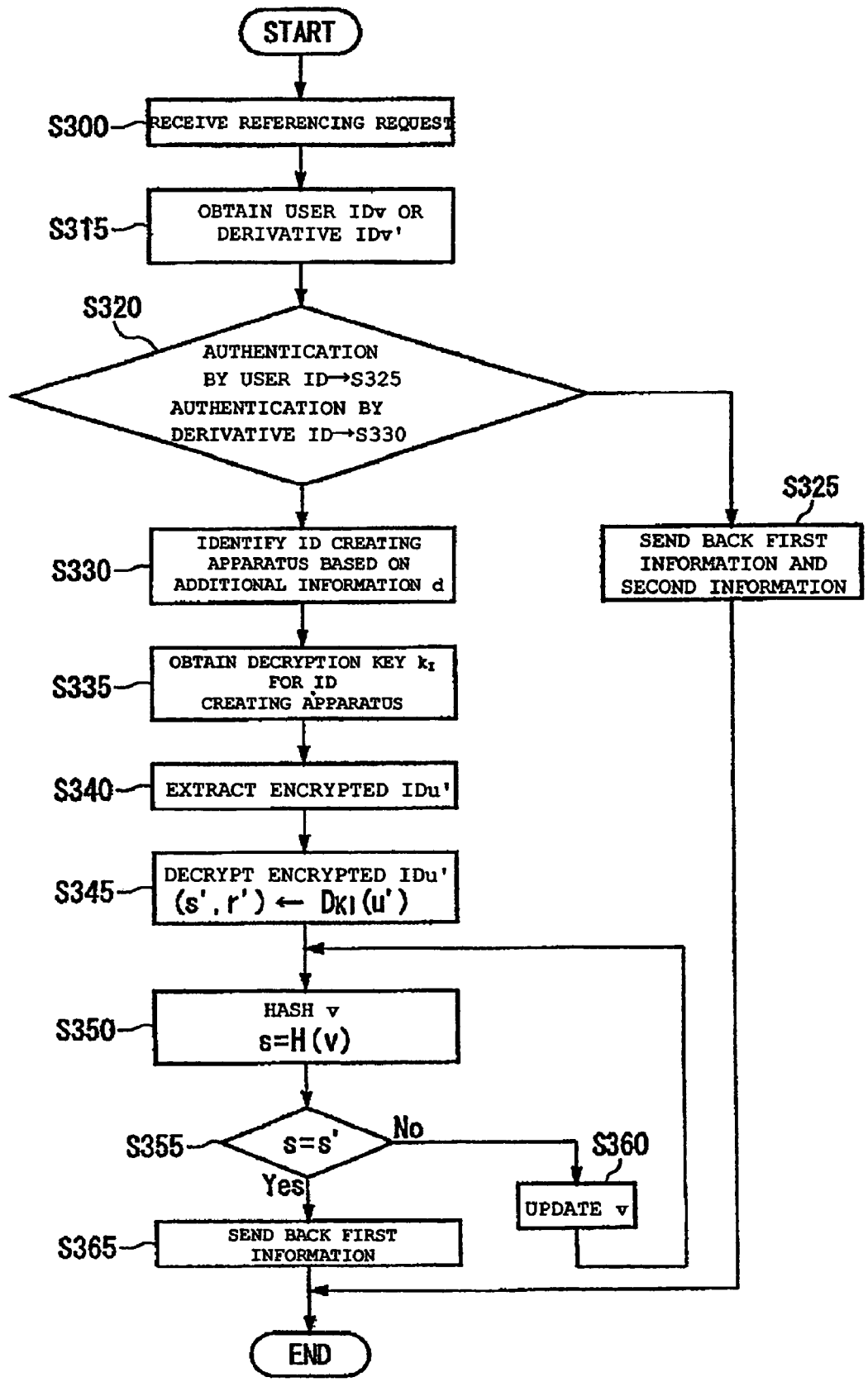
FIG. 3 shows identification information resolving processing of an ID resolving apparatus 150a according to the embodiment.

FIG. 3 shows identification information resolving processing of the ID resolving apparatus 150a according to this embodiment.

First, the referencing request receiving unit 155 receives the referencing request for referencing the personal information of the user (S300). Herein, the referencing request receiving unit 155 of this embodiment receives either a referencing request from the user terminal 100 authenticated by the user ID or a referencing request from the ASP 102 authenticated by the derivative ID. Next, the referencing request receiving unit 155 obtains either the user ID or the derivative ID which are included in the referencing request. (S315). Herein, the referencing request receiving unit 155 may judge whether the ID included in the referencing request is the user ID or the derivative ID based on the ID type number in the additional information included in the referencing request.

When the referencing request receiving unit 155 receives the referencing request authenticated by the user ID from the user terminal 100 (S320), the referencing request processing unit 190 obtains the first and second personal information stored in the personal information storage unit 185 corresponding to the user ID, and transmits the first and second personal information to the user terminal 100 to cause reference to allow the user terminal 100 to reference the first and second information (S325).

When the referencing request receiving unit 155 receives the referencing request authenticated by the derivative ID from the ASP 102 (S320), the ID creating apparatus identifying unit 160 identifies the particular ID creating apparatus 110 which created the derivative ID based on the additional information included in the derivative ID (S330). Next, the decryption key storage unit 165 obtains the decryption key corresponding to the encryption key of the particular ID creating apparatus 150 identified in Step S330, and transmits the decryption key to the encrypted ID decrypting unit 175 (S335). Subsequently, the encrypted ID extracting unit 170 removes the additional information from the derivative ID, and thereby extracts the encrypted ID included in the derivative ID, which is encrypted by the encryption key of the particular ID creating apparatus 110 identified in Step S330 (S340). Next, the encrypted ID decrypting unit 175 decrypts the encrypted ID extracted in Step S340 based on the decryption key obtained in Step S335, and thereby creates the decrypted ID (S345).

Next, the hashing unit 182 serially obtains the plurality of user ID stored in the personal information storage unit 185, and serially converts each piece of the obtained user ID into the hashed ID having the data length shorter than the user ID by use of the same hash function used in the hashing unit 122 (S350). Next, when part of the decrypted ID does not coincide with the hashed ID, the derivation judging unit 184 performs processing of Steps S350 and S355 on the subsequent user ID (S360).

On the contrary, when part of the decrypted ID coincides with the hashed ID (S355: Yes), the derivation judging unit 184 determines that the derivative ID is created from the user ID corresponding to the hashed ID. As a result, upon receipt of the referencing request authenticated by the derivative ID in Step S320, the referencing request processing unit 190 obtains the first personal information stored in the personal information storage unit 185 correlated with the user ID corresponding to the derivative ID, and transmits the first personal information to the ASP 102 which is the sender of the referencing request to allow the ASP 102 to reference the first information (S365). In this case, the referencing request processing unit 190 does not send the second personal information back to the ASP 102. Thus, the referencing request processing unit 190 does not allow the ASP 102 to reference the second personal information.

As described above, when the referencing request authenticated by the derivative ID is received, the ID resolving apparatus 150a judges whether the derivative ID is created from the user ID for each of the plurality of user ID stored in the personal information storage unit 185, and thus determines which user ID the derivative ID is created from. In this way, the ID resolving apparatus 150a can provide the personal information correlated with the user ID which is the source of creating the derivative ID. Herein, the ID resolving apparatus 150a provides the first and second personal information when the user ID is used. Meanwhile, the ID resolving apparatus 150a provides only the first personal information when the derivative ID is used. Accordingly, the ID resolving apparatus 150a restricts the personal information to be provided in response to the referencing request by the derivative ID. In this way, the user can restrict obtainment of the personal information by the ASP 102 even when the derivative ID is registered with the ASP 102 and the like.

In the identification information creating processing shown in FIG. 2 and the identification information resolving processing shown in FIG. 3, the information system 10 may use any of a symmetric key cryptography and a public key cryptography as the encryption method for the encryption key used by the ID creating apparatus 110 and the decryption key used by the ID resolving apparatus 150. In the following, a description will be given of examples of operation processing in the identification information creating processing and the identification information resolving processing regarding the symmetric key encryption method and the public key encryption method, respectively.

(1) Symmetric Key Encryption Method

In the case of the symmetric key cryptography, the key creating apparatus 104 creates a common key k for use in encryption and decryption, and transmits the key k to the ID creating apparatus 110 and the ID resolving apparatus 150, respectively as an encryption key $k_G$ (=k) for use in creation of the derivative ID and a decryption key $k_I$ (=k) for use in judgment of the connection between the derivative ID and the user ID.

a) Identification Information Creating Processing

In Step S210, as shown in the following Formula 1, the hashing unit 122 converts user IDv having a data length of L bits into a hashed IDs having a data length of λ (<L) bits by use of a predetermined hash function $H_1$.

$$s = H_1(v) \quad \text{(Formula 1)}$$

That is, the hash function $H_1$ is a map for converting the user IDv of L bits into the hashed IDs of λ bits, and the hash function $H_1$ satisfies the nature that different user IDv is converted into different hashed IDS.

In Step S220, the hashed ID encrypting unit 124 encrypts the user IDv and a derivative value r based on the encryption key $k_G$ as shown in the following Formulae 2, 3 and 4, and thereby creates encrypted IDu.

$$t = H_2(r \| k_G) \quad \text{(Formula 2)}$$

$$w = s \text{ XOR } t \quad \text{(Formula 3)}$$

$$u = E_{kG}(w \| r) \quad \text{(Formula 4)}$$

Herein, $H_2$ denotes a one-way hash function which is difficult to perform reverse conversion, the operator "∥" denotes a concatenation of bit sequences, the operator XOR denotes exclusive logical sum, $E_{kG}$ denotes encryption using the encryption key $k_G$. Note that the operator "∥" may be conversion which is associated with an interchange of bit positions in addition to the concatenation of the bit sequences.

In Step S225, the derivative ID creating unit 125 creates derivative IDv' by adding additional information d to the encrypted IDu as shown in the following Formula 5.

$$v' = d \| u \quad \text{(Formula 5)}$$

In this event, when the derivative value r is equal to ρ bits and the additional information d is equal to δ bits, the encrypted IDu is equal to λ+ρ bits according to Formula 4 and the derivative IDv' is equal to δ+λ+ρ bits. Herein, in order to express the user IDv and the derivative IDv' by use of the same ID space, it is preferable that the user IDv and the derivative IDv' have the same data length and that L=δ+λ+ρ. Accordingly, the hashed ID encrypting unit 124 creates the encrypted IDu having the data length of λ+ρ bits which is shorter than the data length of the user IDv. Meanwhile, the derivative ID creating unit 125 creates the derivative IDv' which has the same data length as the user IDv. Moreover, it is preferable that λ+ρ is equal to an integral multiple of a block size of encryption by $E_{kG}$.

b) Identification Information Resolving Processing

In Step S340, the encrypted ID extracting unit 170 removes the bit sequence corresponding to the additional information d from the derivative IDv', and thereby extracts encrypted IDu'. In Step S345, the encrypted ID decrypting unit 175 creates decrypted IDx by decrypting the encrypted IDu' as shown in the following Formula 6.

$$x(=w' \| r') = D_{kI}(u') \quad \text{(Formula 6)}$$

Herein, $D_{kI}$ denotes decryption using the decryption key $k_I$.

In Step S350, similar to Formula 1, the hashing unit 182 converts the user IDv into the hashed IDs. Thereafter, in Step S355, the derivation judging unit 184 determines that the derivative IDv' is created from the user IDv when w' which is part of the decrypted IDx coincides with information w created by Formulae 2 and 3 based on the user IDv.

In other words, the derivation judging unit 184 determines that the derivative IDv' is created from the user IDv when s' which is created by the following Formulae 7 and 8 coincides with the hashed IDs.

$$t' = H_2(r' \| k_I) \quad \text{(Formula 7)}$$

$$s' = w' \text{ XOR } t' \quad \text{(Formula 8)}$$

(2) Public Key Cryptography

In the case of the public key encryption method, the key creating apparatus 104 creates an encryption key $k_G$ for use in creation of the derivative ID and a decryption key $k_I$ (≠$k_G$) for use in identification of the connection between the derivative ID and the user ID, and transmits the encryption key and the decryption key respectively to the ID creating apparatus 110 and to the ID resolving apparatus 150. Herein, it is based on the premise that the encryption key $k_G$ is a public key and the decryption key $k_I$ is a secret key.

a) Identification Information Creating Processing

In Step S210, the hashing unit 122 creates the hashed IDS similarly to Formula 1 in the symmetric key cryptography. In Step S220, the hashed ID encrypting unit 124 encrypts the user IDv and the derivative value r based on the encryption key $k_G$ as shown in the following Formula 9, and thereby creates the encrypted IDu.

$$u = E_{kG}(s \| r) \quad \text{(Formula 9)}$$

In Step S225, the derivative ID creating unit 125 creates the derivative IDv' similarly to Formula 5 in the symmetric key cryptography. In this event, when the data length of the encrypted IDu is equal to a bits, the data length of derivative IDv' is δ+σ bits. Here, in order to express the user IDv and the derivative IDv' by use of the same ID space, it is preferable that the user IDv and the derivative IDv' have the same data length and that L=δ+σ.

Accordingly, the hashed ID encrypting unit 124 creates the encrypted IDu having the data length of σ bits which is shorter than or equal to the data length of the user IDv. Meanwhile, the derivative ID creating unit 125 creates the derivative IDv' which has the same data length as the user IDv.

b) Identification Information Resolving Processing

In Step S340, the encrypted ID extracting unit 170 removes the bit sequence corresponding to the additional information d from the derivative IDv', and thereby extracts the encrypted IDu'. In Step S345, the encrypted ID decrypting unit 175 creates the decrypted IDx by decrypting the encrypted IDu' as shown in the following Formula 10.

$$x(=s'\|r')=D_{kl}(u') \quad \text{(Formula 10)}$$

In Step S350, the hashing unit 182 converts the user IDv into the hashed IDs similarly to Formula 1. Thereafter, in Step S355, the derivation judging unit 184 determines that the derivative IDv' is created from the user IDv when s', part of the decrypted IDx, coincides with the hashed IDs created by Formula 1 based on the user IDv.

Herein, in the above-described symmetric key cryptography and public key cryptography, the derivative value creating unit. 115 may serially create the derivative values based on a predetermined sequence of numbers or on a random number. Moreover, in Formula 1, it is preferable that the hash function H1 satisfies $H_1(v_o) \neq H_1(v_1)$ for different users $IDv_o$ and $IDv_1$. Herein, in a certain combination of user IDs, the probability that the user ID having the same hashed IDs as that of the different user ID is calculated as (the number of the user ID/$2^{\lambda/2}$). To attain this, it is preferable to use a cryptographically safe one-way hash function such as SHA1 or MD5 and to set the bit length λ of the hashed IDs to a certain value or higher in order to sufficiently reduce the probability at the different user IDs have the same hashed ID.

Meanwhile, to facilitate update of the encryption key and the decryption key, the key creating apparatus 104 may create the encryption key and the decryption key by use of a hash chain. For example, in the symmetric key cryptography, when the initial value of the common key k is denoted as $k_0$ and the common key to be used at the point after updating for n times is denoted as $k_n$, the key creating apparatus 104 uses the one-way hash function H to calculate $k_0=H^{(n)}(k_n)=H(\ldots H(H(k_n))\ldots))$. The ID creating apparatus 110 and the ID resolving apparatus 150 calculate $k_i=H^{(n-i)}(k_n)$ at each time the common key is updated. In this way, the ID resolving apparatus 150 is able to calculate an old common key $k_j$ (j<i) as $k_j=H^{(i-j)}(k_i)$, and to identify the connection between the derivative ID created by an old encryption key and the user ID. Meanwhile, due to the one-way property of the hash function H, it is difficult to create a future common key from a current common key. Accordingly, even in the case of leakage of the common key, it is possible to avoid unauthorized identification of the connection between a new derivative ID and the user ID by another server or the like if the common key is updated.

Moreover, also in the public key cryptography, it is possible to update the encryption key and the decryption key easily by creating one of the encryption key and the decryption key similarly to the method described above.

Figure 4:
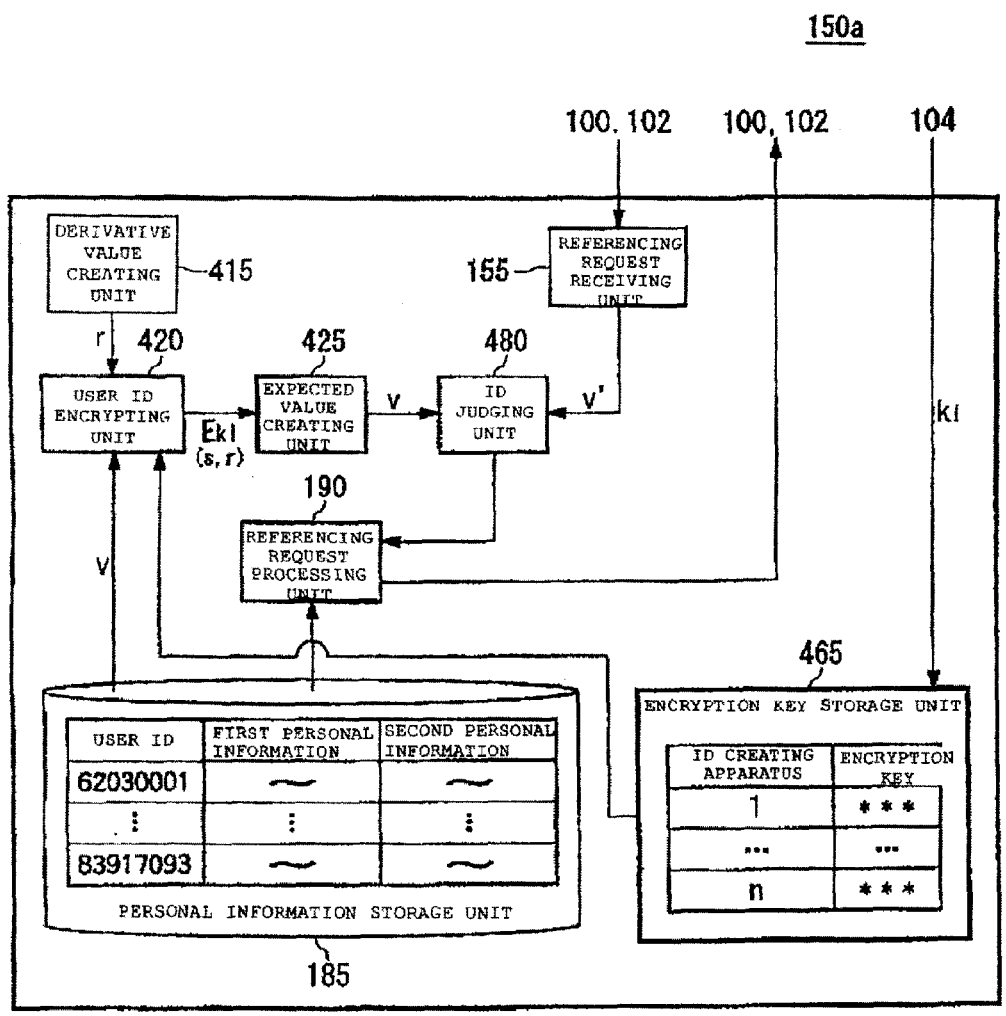
FIG. 4 shows a configuration of an ID resolving apparatus 150a according to a first different example of the embodiment.

FIG. 4 shows a configuration of an ID resolving apparatus 150*a* according to a first different example of this embodiment. The ID resolving apparatus 150*a* of this different example retains an encryption key, which is the same as the encryption key in the ID creating apparatus 110, inside an encryption key storage unit 465 in advance. Moreover, the ID resolving apparatus 150*a* creates a list of the derivative ID in advance, which are created from the respective pieces of the user ID inside the personal information storage unit 185. The ID resolving apparatus 150 of this different example includes the referencing request receiving unit 155, the personal information storage unit 185, the referencing request processing unit 190, the encryption key storage unit 465, a derivative value creating unit 415, a user ID encrypting unit 420, an expected value creating unit 425, and an ID judging unit 480. The referencing request receiving unit 155, the personal information storage unit 185, and the referencing request processing unit 190 respectively adopt the same constitutions as the members of the same reference numerals in FIG. 1. Accordingly, a description thereof will be omitted except differences therebetween.

The encryption key storage unit 465 stores the encryption key which is identical to the encryption key retained by the ID creating apparatus 110 for the respective ID creating apparatuses 110*a* and 110*b*. The derivative value creating unit 415 creates the derivative value which is a data value determined based on a predetermined algorithm. Herein, the derivative value creating unit 415 adopts a constitution similar to the derivative value creating unit 115 and creates the same derivative value as the derivative value creating unit 115. The user ID encrypting unit 420 adopts a constitution similar to the user ID encrypting unit 120 and serially obtains the user ID from the personal information storage unit 185. Moreover, the user ID encrypting unit 420 encrypts the information including the user ID and the derivative value based on the encryption key predetermined by the key creating apparatus 104 and registered with the encryption key storage unit 465, and thereby creates the encrypted ID. The expected value creating unit 425 adopts a constitution similar to the derivative ID creating unit 125 and creates a list of expected values for the derivative ID based on the encrypted ID. The ID judging unit 480 determines that the derivative ID is created from the user ID when the derivative ID included in the referencing request received by the referencing request receiving unit 155 coincides with the expected value created by the derivative value creating unit 415, the user ID encrypting unit 420 and the expected value creating unit 425.

Figure 5:
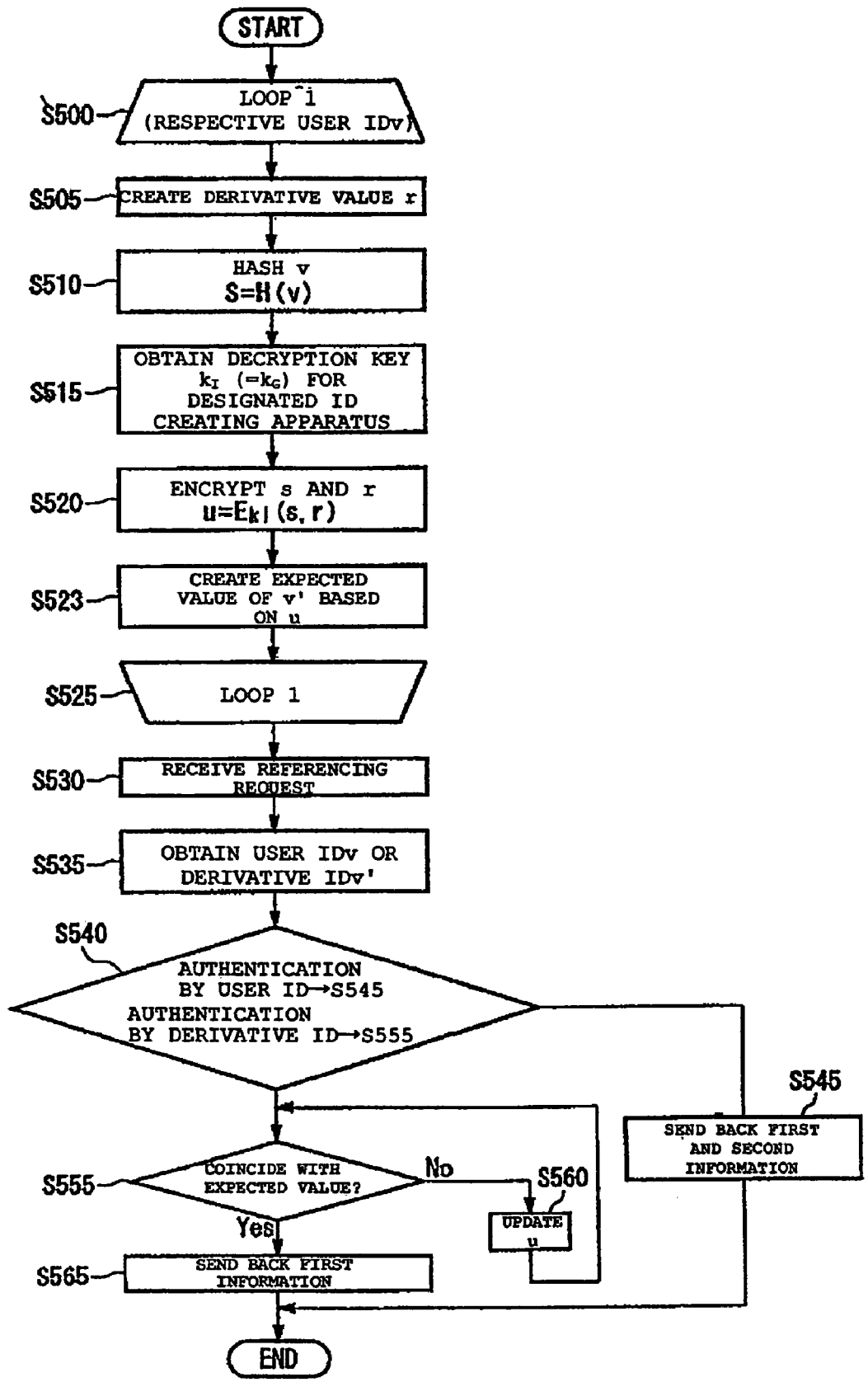
FIG. 5 shows identification information resolving processing of the ID resolving apparatus 150a according to the first different example of the embodiment.

FIG. 5 shows the identification information resolving processing of the ID resolving apparatus 150*a* according to the first different example of this embodiment.

First, the user ID encrypting unit 420 obtains the user ID of respective users serially from the personal information storage unit 185 and starts loop processing for creating the expected values of the user ID of the respective users (S500). Next, similar to the derivative value creating unit 115, the derivative value creating unit 415 creates the derivative value serving as the data value determined to select the derivative ID to be created from the user ID (S505). Subsequently, the hashing unit 122 inside the user ID encrypting unit 420 converts the user ID into the hashed ID having the data length shorter than the user ID by use of the predetermined hash function (S510). Next, the hashed ID encrypting unit 124 inside the user ID encrypting unit 420 selects any of the ID creating apparatuses 110*a* and 110*b* and obtains the encryption key which is identical to the encryption key retained by the selected ID creating apparatus 110 from the encryption key storage unit 465 (S515). Next, the hashed ID encrypting unit 124 creates the encrypted ID by encrypting the information including the hashed ID and the derivative value based on the encryption key obtained in Step S515 (S520).

Next, the expected value creating unit 425 creates the expected value for the derivative ID based on the encrypted ID by means of processing similar to the processing of the derivative ID creating unit 125 for creating the derivative ID (S523). The derivative value creating unit 415, the user ID encrypting unit 420, and the expected value creating unit 425 repeat the processing of Steps S505, S510, S515, S520, and S523, and thereby create the expected value for the derivative ID corresponding to each piece of the user ID (S525).

Next, the referencing request receiving unit 155 receives the referencing request for referencing the personal information of the user (S530). Next, similar to Step S315 shown in FIG. 3, the referencing request receiving unit 155 obtains either the user ID or the derivative ID included in the referencing request (S535).

When the referencing request receiving unit 155 receives the referencing request authenticated by the user ID from the user terminal 100 (S540), similar to Step S325 shown in FIG. 3, the referencing request processing unit 190 obtains the first and second personal information stored in the personal information storage unit 185 corresponding to the user ID, and transmits the first and second personal information to the user terminal 100 which is the sender of the referencing request to allow the user terminal 100 to reference the first and second personal information (S545).

When the referencing request receiving unit 155 receives the referencing request authenticated by the derivative ID from the ASP 102 (S540), the ID judging unit 480 searches the expected value which coincides with the derivative ID included in the referencing request. When the derivative ID coincides with a particular expected value, the ID judging unit 480 determines that the derivative ID is created from the user ID corresponding to the particular expected value (S555 and S560). As a result, upon receipt of the referencing request authenticated by the derivative ID in Step S540, the referencing request processing unit 190 obtains the first personal information which is correlated with the user ID corresponding to the derivative ID to be stored in the personal information storage unit 185, and transmits the first personal information to the ASP 102 which is the sender of the referencing request to allow the ASP 102 to reference the first personal information (S565). In this case, the referencing request processing unit 190 does not send the second personal information back to the ASP 102. Thus, the referencing request processing unit 190 does not allow the ASP 102 to reference the second personal information.

According to the ID resolving apparatus 150a of this different example, it is possible to create the expected value for the derivative ID in advance, which is created by the ID creating apparatus 110, by use of the same encryption key as the encryption key retained by the ID creating apparatus 110 and the same derivative value as the derivative value created by the derivative value creating unit 115. In this way, the ID resolving apparatus 150a does not need to perform processing shown in FIG. 1 such as decryption with the encrypted ID decrypting unit 175 or hashing with the hashing unit 182 after receiving the referencing request. Accordingly, it is possible to identify the user ID corresponding to the derivative ID rapidly.

Figure 6:
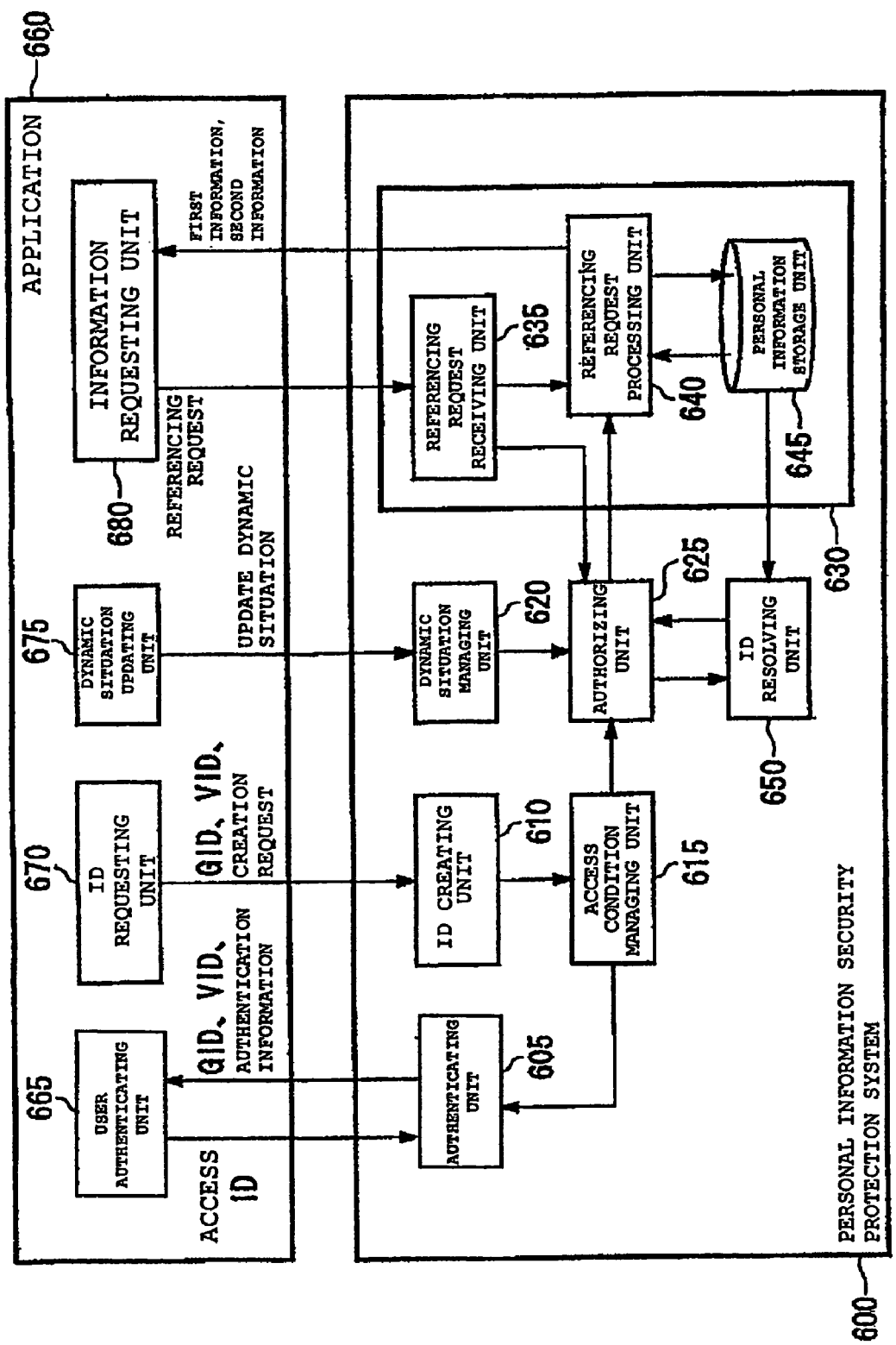
FIG. 6 shows a configuration of an information system 10 according to a second different example of the embodiment.

FIG. 6 shows a configuration of the information system 10 according to a second different example of this embodiment. The information system 10 according to this different example includes a personal information security protection system 600 which provides integrated functions of the ID creating apparatuses 110a and 110b as well as the ID resolving apparatuses 150a and 150b, and an application 660 executed on the user terminal 100 and/or the ASP 102 which use the functions of the personal information security protection system 600.

The personal information security protection system 600 includes an authenticating unit 605, an ID creating unit 610, an access condition managing unit 615, a dynamic situation managing unit 620, an authorizing unit 625, a personal information managing unit 630, and an ID resolving unit 650.

The authenticating unit 605 receives access ID such as a log-in name entered by a user and a password corresponding to the access ID from the application 660, and thereby authenticates the user. Thereafter, when the user is duly authenticated, the authenticating unit 605 sends user ID (GID) or derivative ID (VID) corresponding to the access ID back to the application 660. Meanwhile, the authenticating unit 605 may retain correlation between the access ID and either the user ID or the derivative ID. Alternatively, the authenticating unit 605 may obtain such correlation between the access ID and either the user ID or the derivative ID from a personal information storage unit 645 inside the personal information managing unit 630.

The ID creating unit 610 receives a request by the user for creating the derivative ID from the application 660 and creates the derivative ID which is correlated with the user ID. Moreover, the ID creating unit 610 receives, from the application 660, a disclosure condition of the personal information which is designated by the user, and instructs the access condition managing unit 615 as to which part of the personal information is referenced in response to a referencing request authenticated by the derivative ID. The ID creating unit 610 may also include the derivative value creating unit 115, the user ID encrypting unit 120, the derivative ID creating unit 125, and the encryption key storage unit 130 which are shown in FIG. 1.

The access condition managing unit 615 manages the access condition indicating which part of the personal information is referenced. Upon receipt of the referencing request, the access condition managing unit 615 transmits, to the authorizing unit 625, the access condition corresponding to the user ID or the derivative ID. The dynamic situation managing unit 620 dynamically sets the access condition depending on an operation by the user or the like. Upon receipt of the referencing request, the dynamic situation managing unit 620 transmits, to the authorizing unit 625, the access condition for the user ID or the derivative ID corresponding to the referencing request. Herein, the dynamic situation managing unit 620 sets the dynamic access condition depending on factors such as a sender of the referencing request, a purpose of referencing the personal information, or presence of consent by the user for referencing the personal information.

When the personal information managing unit 630 receives the referencing request from the application 660, the authorizing unit 625 receives the access condition corresponding to the user ID or the derivative ID included in the referencing request from the access condition managing unit 615 and from the dynamic situation managing unit 620. Thereafter, the authorizing unit 625 identifies the user ID corresponding to the referencing request by use of the ID resolving unit 650 and notifies the personal information managing unit 630 as to which part of the personal information corresponding to the user ID is authorized for reference.

The personal information managing unit 630 retains the personal information of the user by correlating the personal information with the user ID of the user. The personal information managing unit 630 includes a referencing request receiving unit 635, a referencing request processing unit 640 and the personal information storage unit 645. The referencing request receiving unit 635, the referencing request processing unit 640, and the personal information storage unit 645 of this modified example adopt similar constitutions of the referencing request receiving unit 155, the referencing request processing unit 190, and the personal information storage unit 185, respectively. Therefore, a description thereof will be omitted herein.

The ID resolving unit 650 receives the derivative ID included in the referencing request from the authorizing unit 625 and sends the user ID corresponding to the derivative ID back to the authorizing unit 625. The ID resolving unit 650 may include the ID creating apparatus identifying unit 160, the decryption key storage unit 165, the encrypted ID extracting unit 170, the encrypted ID decrypting unit 175, and the ID judging unit 180 shown in FIG. 1. Alternatively, the ID resolving unit 650 may include the derivative value creating unit 415, the user ID encrypting unit 420, the expected value creating unit 425, the encryption key storage unit 465, and the ID judging unit 480 shown in FIG. 4. Meanwhile, instead of obtaining the user ID from the personal information storage unit 645 inside the personal information managing unit 630, the ID resolving unit 650 may retain a list of registered user ID inside the ID resolving unit 650.

The application 660 includes a user authenticating unit 665, an ID requesting unit 670, a dynamic situation updating unit 675, and an information requesting unit 680. The user authenticating unit 665 transmits the access ID and the password entered by the user or the like to the authenticating unit 605 to authenticate the user. When the user is authenticated, the user authenticating unit 665 receives the user ID or the derivative ID corresponding to the access ID. The ID requesting unit 670 transmits the request for creating the derivative ID corresponding to the user ID to the ID creating unit 610 and obtains the derivative ID correlated with the user ID from the ID creating unit 610. The dynamic situation updating unit 675 transmits the access condition, which is dynamically designated in accordance with the operation by the user or the like, to the dynamic situation managing unit 620 to set up the access condition. The information requesting unit 680 transmits the referencing request for the personal information corresponding to the user ID or the derivative ID and obtains the personal information from the personal information managing unit 630.

According to the personal information security protection system 600 and the application 660 described above, the functions such as authentication of the user by use of the access ID, creation of the derivative ID, dynamic updating of the access condition, and reference to the personal information by use of the user ID or the derivative ID can be provided as basic interfaces for using the personal information security protection system 600 through the user authenticating unit 665, the ID requesting unit 670, the dynamic situation updating unit 675, and the information requesting unit 680. Herein, the respective members inside the personal information security protection system 600 may be realized by a plurality of servers. In this case, the ID creating unit 610 does not need to transmit the connection between the user ID and the derivative ID to the ID resolving unit 650 because the ID creating unit 610 creates the derivative ID such that the ID resolving unit 650 can determine the correlation with the user ID based on the derivative ID. In this way, the personal information security protection system 600 can provide the information system 10 which can create and utilize the derivative ID efficiently.

Figure 7:
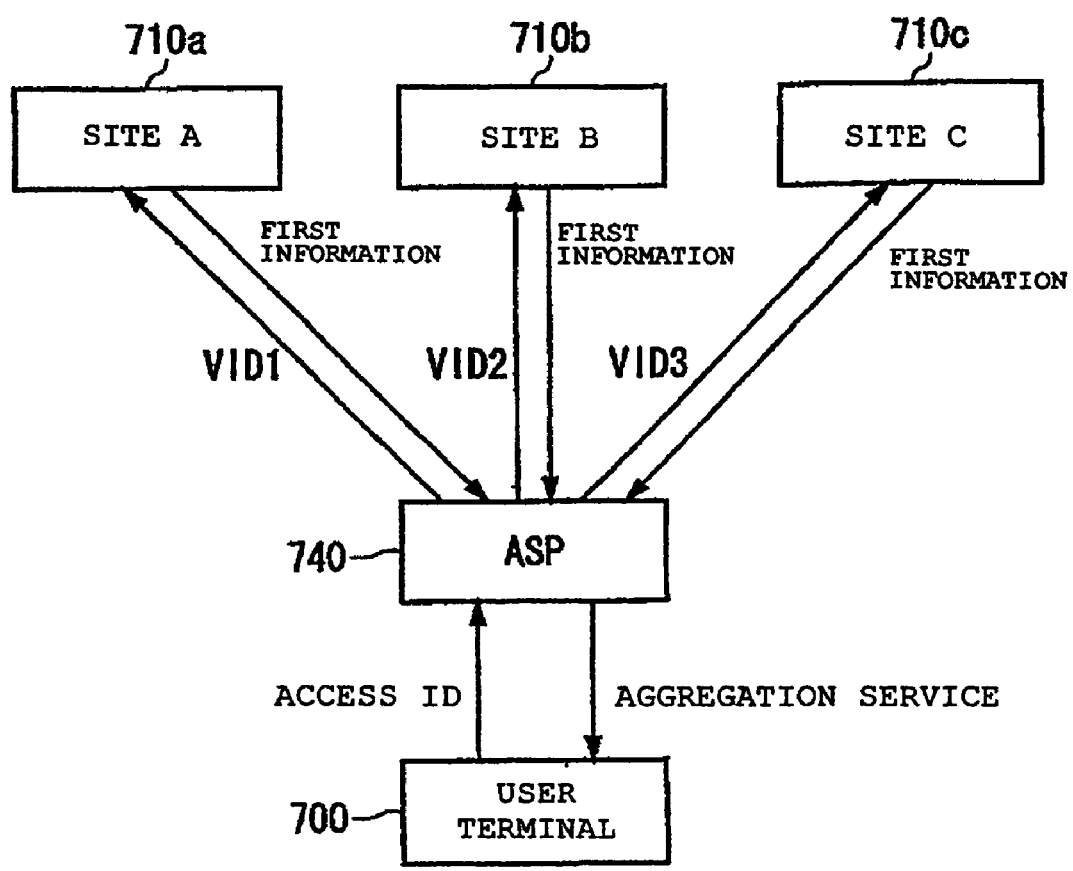
FIG. 7 shows an example of a service to be provided by the information system 10 according to the embodiment.

FIG. 7 shows an example of an account aggregation service provided by the information system 10 according to this embodiment. A user terminal 700 is a terminal used by a user. Sites 710a to 710c are service sites having the user ID respectively registered by the user of the user terminal 700 and having the functions as the ID resolving apparatus 150. Each of the sites 710a to 710c may be an account management site of a financial institution, for example. An ASP 740 provides an account aggregation service for allowing the user to integrally browse the accounts registered with the sites 710a to 710c on one screen.

Instead of the user ID respectively registered with the sites 710a to 710c, the derivative ID VID1 to VID3 a, which are respectively created based on the user ID registered with the ASP 740 based on these pieces of IDs. In this way, the ASP 740 can reference the personal information retained by the sites 710a to 710c only to the extent that is authorized by the user of the user terminal 700 by use of the derivative ID VID1 to VID3. Moreover, when the derivative ID VID1 to VID3 are received, the sites 710a to 710c can identify the user ID corresponding to the respective derivative ID and provide the personal information correlated with the user ID for reference.

In this case, the derivative ID VID1 to VID3 may be created by the sites 710a to 710c and registered with the ASP 740 through the user. Alternatively, the user terminal 700 may have the functions of the ID creating apparatus 110 and register the derivative ID VID1 to VID3 created by the user terminal 700 with the ASP 740. In this case, the user terminal 700 does not need to transmit the connection between the user ID and the derivative ID to the sites 710a to 710c. Accordingly, it is possible to create the derivative ID efficiently.

Figure 8:
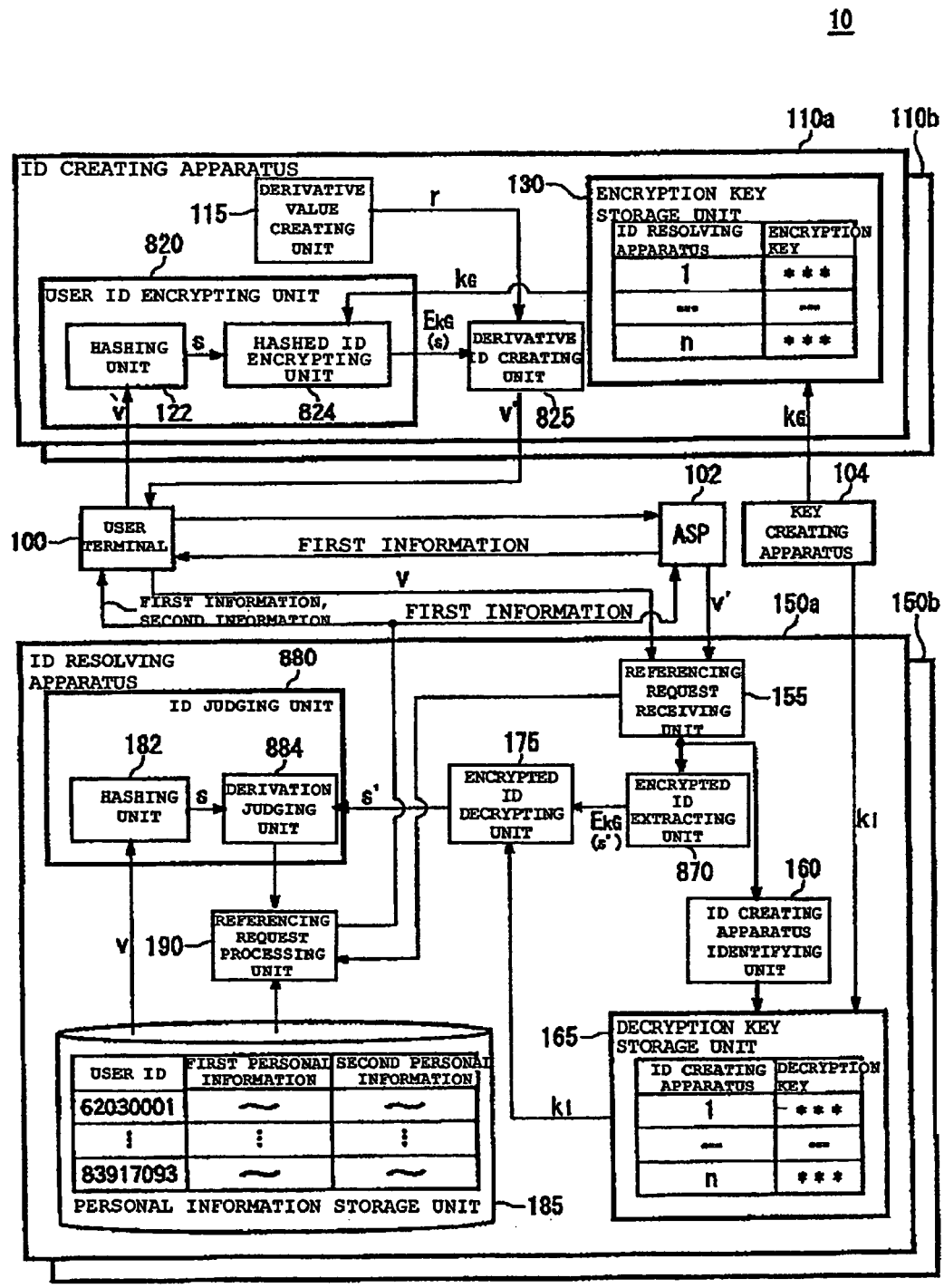
FIG. 8 shows a configuration of an information system 10 according to a third different example of the embodiment.

FIG. 8 shows a configuration of the information system 10 according to a third different example of this embodiment. In the information system 10 according to this different example, the respective members having the same reference numerals as those in the information system 10 in FIG. 1 adopt the similar constitutions to those in FIG. 1. Accordingly, a description thereof will be omitted herein except differences.

A user ID encrypting unit 820 creates the encrypted ID by encrypting information including user ID based on the encryption key, which is predetermined by the key creating apparatus 104 and registered with the encryption key storage unit 130. The user ID encrypting unit 820 includes the hashing unit 122 which adopts the constitution similar to the hashing unit 122 shown in FIG. 1, and a hashed ID encrypting unit 824 for encrypting information including the hashed ID based on the encryption key registered with the encryption key storage unit 130 and thereby creating the encrypted ID. A derivative ID creating unit 825 creates the derivative ID which includes the encrypted ID and the derivative value created by the derivative value creating unit 115.

An encrypted ID extracting unit 870 extracts the encrypted ID, which is included as part of the derivative ID and encrypted based on the predetermined encryption key by use of the ID creating apparatus 110 that created the derivative ID. To be more precise, the encrypted ID extracting unit 870 extracts the encrypted ID by removing the derivative value added by the ID creating apparatus 110 and other additional information from the derivative ID. An ID judging unit 880 determines that the derivative ID is created from the user ID when at least part of the decrypted ID created by the encrypted ID decrypting unit 175 coincides with any information created based on any of the user ID stored in the personal information storage unit 185. The ID judging unit 880 includes the hash converting unit 182 adopting the similar constitution to the hashing unit 182 shown in FIG. 1, and a derivative ID judging unit 884, which is configured to determine that the derivative ID is created from the user ID when at least part of the decrypted ID, i.e. part or all of the decrypted ID, coincides with the hashed ID.

Figure 9:
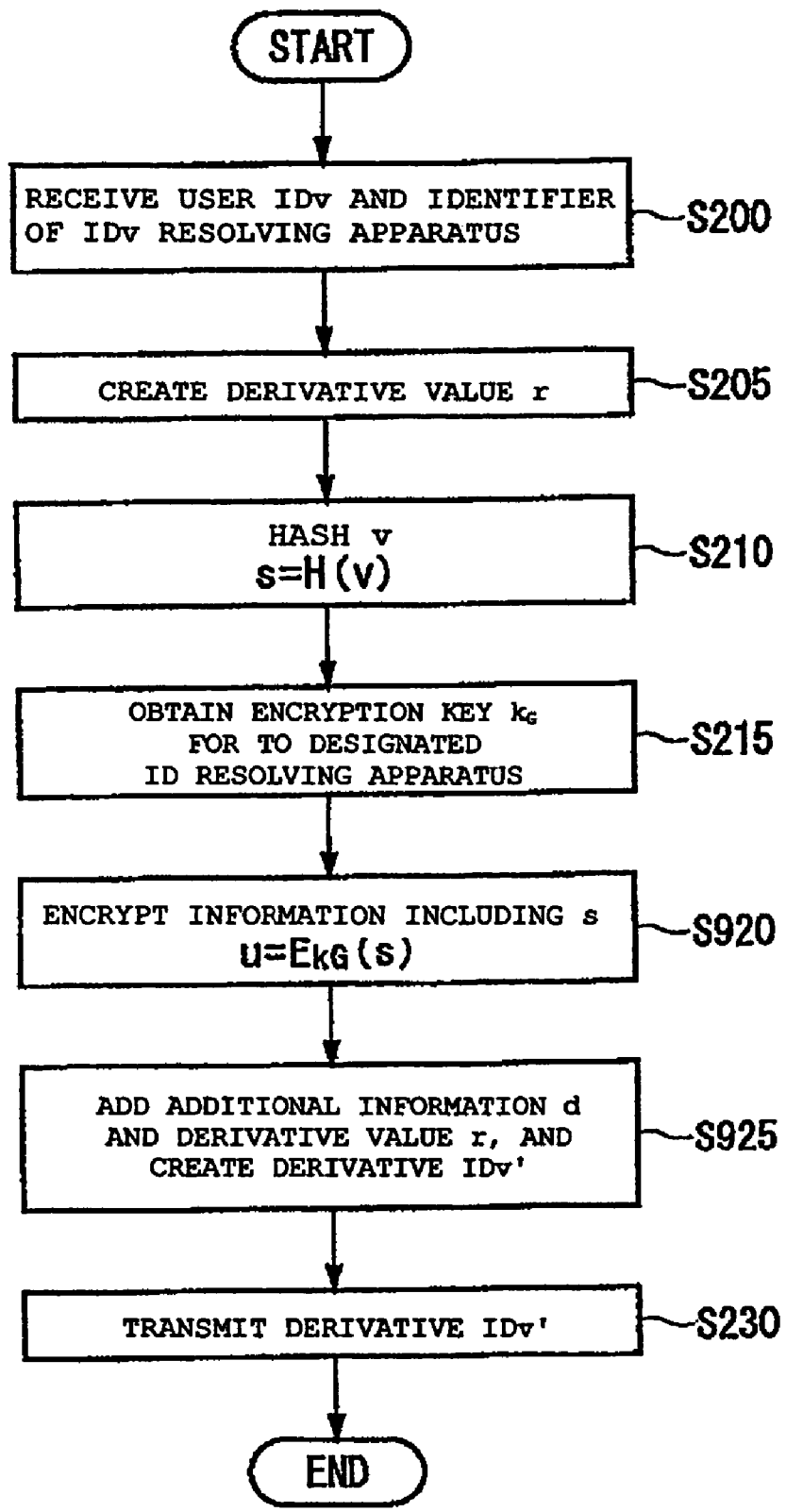
FIG. 9 shows identification information creating processing of an ID creating apparatus 110a according to the third different example of the embodiment.

FIG. 9 shows identification information creating processing of the ID creating apparatus 110a according to the third different example of this embodiment. The identification information creating processing of the ID creating apparatus 110a of this different example is substantially the same as the identification information creating processing shown in FIG. 2 except that Steps S220 and S225 in FIG. 2 are replaced by Steps S920 and S925. Accordingly, a description thereof will be omitted except the following differences.

In Step S920, the hashed ID encrypting unit 824 encrypts the information including the user ID based on the encryption key obtained in Step S215, and thereby creates the encrypted ID. Next, in Step S925, the derivative ID creating unit 825 creates the derivative ID based on the encrypted ID and the derivative value.

In this case, the ID creating apparatus 110a can create a plurality of derivative ID from one user ID by changing the derivative value created in Step S205. In other words, in Step S205, the derivative value creating unit 115 creates first and second derivative values which are mutually different data values. Moreover, in Step S220, the hashed ID encrypting unit 124 creates the encrypted ID by encrypting the information including the hashed ID. Thereafter, in Step S925, the derivative ID creating unit 125 creates first derivative ID which includes the encrypted ID, the first derivative value and the additional information, and second derivative ID which includes second encrypted ID, the second derivative value and the additional information.

Figure 10:
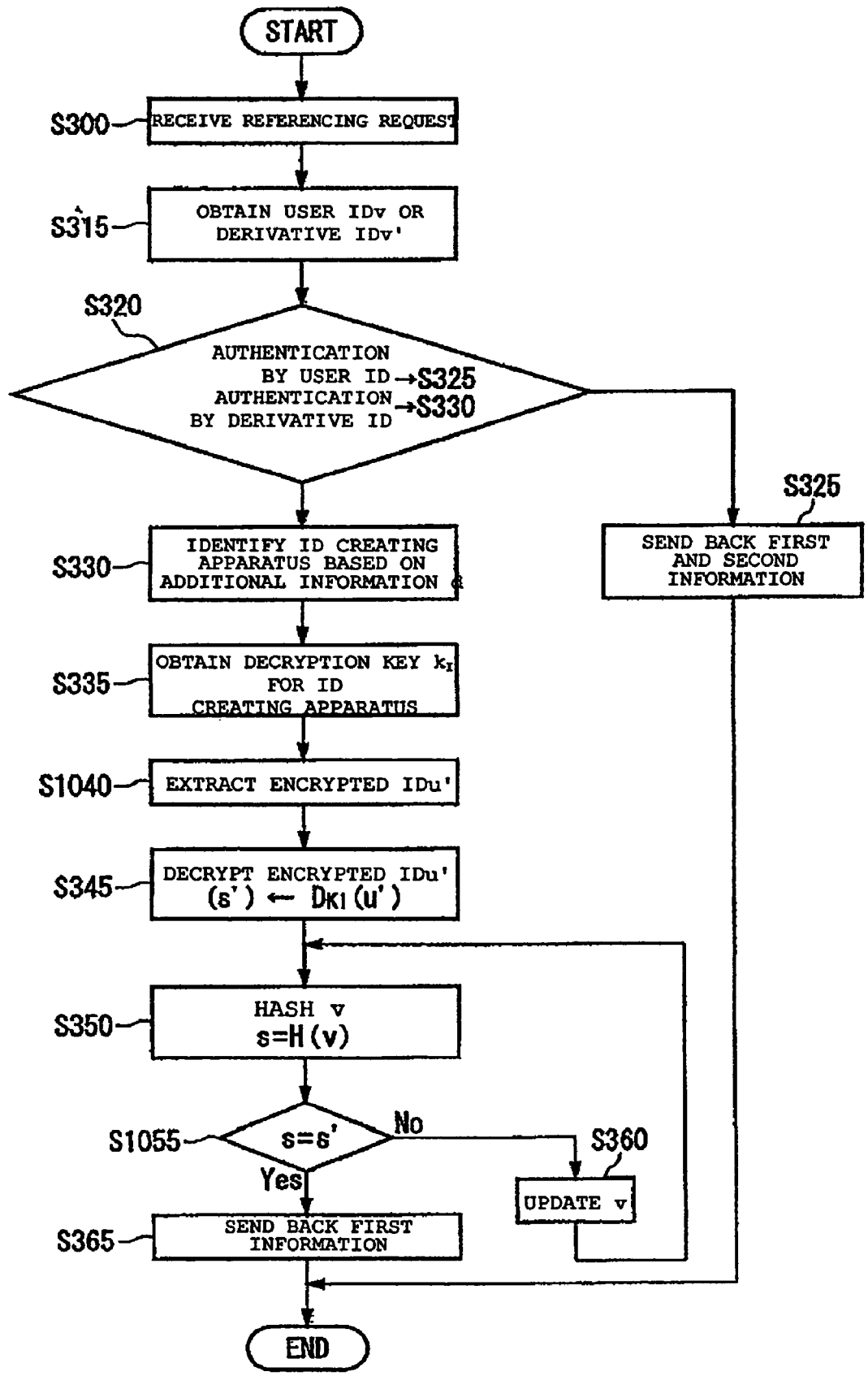
FIG. 10 shows identification information resolving processing of an ID resolving apparatus 150a according to the third different example of the embodiment.

FIG. 10 shows identification information resolving processing of the ID resolving apparatus 150a according to the third different example of this embodiment. The identification information resolving processing of the ID resolving apparatus 150a of this different example is substantially the same as the identification information resolving processing shown in FIG. 3 except that Steps S340 and S345 in FIG. 3 are replaced by Steps S1040 and S1045. Accordingly, a description thereof will be omitted except the following differences.

In Step S1040, the encrypted ID extracting unit 870 extracts the encrypted ID which is included as part of the derivative ID and encrypted by the encryption key for a particular ID creating apparatus 110 identified in Step S330, by removing the derivative value and the additional information from the derivative ID.

In Step S1055, when the decrypted ID does not coincide with the hashed ID at all, the derivative ID judging unit 884 performs processing for Steps S350 and S1055 regarding the subsequent user ID (S360). On the contrary, when at least part of the decrypted ID coincides with the hashed ID (S1055: Yes), the derivative ID judging unit 884 judges that the derivative ID is created out of the user ID corresponding to the hashed ID.

According to the above-described information system 10 of the third different example, it is possible to create the derivative ID by adding the derivative value after encrypting the hashed ID. In this way, even in the case of creating the plurality of derivative ID from the same user ID, it is satisfactory if the encryption processing is performed only once by the hashed ID encrypting unit 824. Accordingly, it is possible to create the plurality of derivative ID with small operation throughput.

Figure 11:
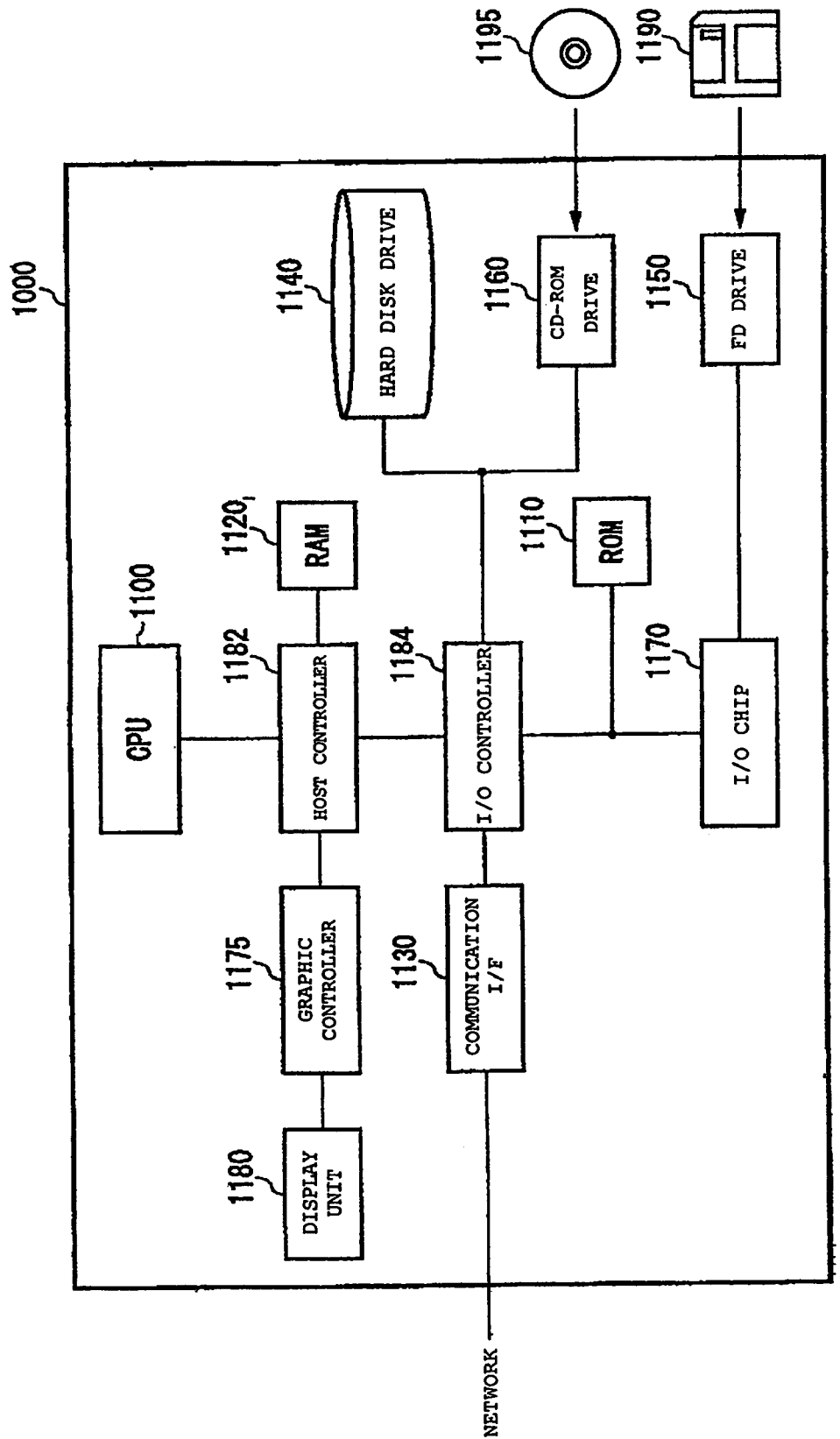
FIG. 11 shows a hardware configuration of the ID creating apparatus 110a and the ID resolving apparatus 150a according to the embodiment.

FIG. 11 shows a hardware configuration of the ID creating apparatus 110a and the ID resolving apparatus 150a according to this embodiment. Each of the ID creating apparatus 110a and the ID resolving apparatus 150a of this embodiment is achieved by an information processing apparatus 1000, which includes: a CPU peripheral unit having a CPU 1100, a RAM 1120, a graphic controller 1175 and a display unit 1180 which are interconnected through a host controller 1182; an input/output unit having a communication interface 1130, a hard disk drive 1140, a CD-ROM drive 1160 and the ID creating apparatus 110 which are connected to the host controller 1182 through an input/output controller 1184; and a legacy input/output unit having a ROM 1110, a flexible disk drive 1150, and an input/output chip 1170 which are connected to the input/output controller 1184.

The host controller 1182 is connected to the RAM 1120, the CPU 1100 accessing the RAM 1120 at a high transfer rate, and the graphic controller 1175. The CPU 1100 operates based on a program stored in the ROM 1110 and the RAM 1120 and controls the respective units. The graphic controller 1175 obtains image data created by the CPU 1100 and the like on a frame buffer provided in the RAM 1120 and displays the image data on the display unit 1180. Alternatively, the graphic controller 1175 may incorporate the frame buffer, which is for storing the image data created by the CPU 1100 and the like, inside the graphic controller 1175.

The input/output controller 1184 is connected to the host controller 1182 and relatively high-speed input/output apparatuses such as the communication interface 1130, the hard disk drive 1140 and the CD-ROM drive 1160. The communication interface 1130 communicates with other apparatuses through a network. The hard disk drive 1140 stores a program and data to be used by the information processing apparatus 1000. The CD-ROM drive 1160 reads a program or data from a CD-ROM 1195 and provides the program or the data to the RAM 1120 and/or the hard disk drive 1140.

Meanwhile, relatively low-speed input/output apparatuses such as the ROM 1110, the flexible disk drive 1150, and the input/output chip 1170 are connected to the input/output controller 1184. The ROM 1110 stores a boot program executed by the CPU 1100 upon starting the information processing apparatus 1000, a program dependent on the hardware of the information processing apparatus 1000, and the like. The flexible disk drive 1150 reads a program or data from a flexible disk 1190 and provides the program or the data to the information processing apparatus 1000 and/or the hard disk drive 1140 through the input/output controller 1184. The input/output chip 1170 connects the flexible disk 1190 and other various input/output apparatuses through a parallel port, a serial port, a keyboard port, a mouse port or the like, for example.

The program provided to the CPU 1100 through the RAM 1120 is stored in a recording medium such as the flexible disk 1190, the CD-ROM 1195 or an IC card, and is provided to the user. The program is read from the recording medium, installed in the information processing apparatus 1000 through the input/output controller 1184 and the RAM 1120, and executed by the CPU 1100.

An ID creation program for achieving the ID creating apparatus 110a installed in and executed by the information processing apparatus 1000 includes: a user ID encryption module having a derivative value creation module, a hashing module and hashed ID encryption module; a derivative ID creation module; and an encryption key storage module. These program or the modules allow the information processing apparatus 1000 to function respectively as the user ID encrypting unit 120 including the derivative value creating unit 115, the hashing unit 122 and the hashed ID encrypting unit 124, the derivative ID creating unit 125, and the encryption key storage unit 130. Alternatively, the program or the modules may allow the information processing apparatus 1000 to function severally as the user ID encrypting unit 820 including the derivative value creating unit 115, the hashing unit 122 and the hashed ID encrypting unit 824, the derivative ID creating unit 825, and the encryption key storage unit 130.

Meanwhile, an ID resolution program for achieving the ID resolving apparatus 150*a* to be installed in and executed by the information processing apparatus 1000 includes: a referencing request receipt module; an ID creating apparatus identification module; a decryption key storage module; an encrypted ID extraction module; an encrypted ID decryption module; an ID judgment module having a hashing module and a derivation judgment module; a personal information storage module; and a referencing request processing module. The program or the modules allow the information processing apparatus 1000 to function respectively as the referencing request receiving unit 155, the ID creating apparatus identifying unit 160, the decryption key storage unit 165, the encrypted ID extracting unit 170, the encrypted ID decrypting unit 175, the ID judging unit 180 having the hashing unit 182 and the derivation judging unit 184, the personal information storage unit 185, and the referencing request processing unit 190. Alternatively, the program or the modules may allow the information processing apparatus 1000 to function respectively as the referencing request receiving unit 155, the ID creating apparatus identifying unit 160, the decryption key storage unit 165, the encrypted ID extracting unit 870, the encrypted ID decrypting unit 175, the ID judging unit 880 having the hashing unit 182 and the derivative ID judging unit 884, the personal information storage unit 185, and the referencing request processing unit 190.

Instead of the above-described configuration, the ID resolution program may include: a referencing request receipt module; a personal information storage module; a referencing request processing module; a derivative value creation module; a user ID encryption module; an expected value creation module; an encryption key storage module; and an ID judgment module. In this case, the program or the modules allow the information processing apparatus 1000 to function respectively as the referencing request receiving unit 155, the personal information storage unit 185, the referencing request processing unit 190, the derivative value creating unit 415, the user ID encrypting unit 420, the expected value creating unit 425, the encryption key storage unit 465, and the ID judging unit 480.

The above-described programs or modules may be stored in an external recording medium. As for the recording medium, in addition to the flexible disk 1190 and the CD-ROM 1195, it is possible to use an optical recording medium such as a DVD or a PD, a magneto-optical recording medium such as an MD, a tape medium, or a semiconductor memory such as an IC card. Moreover, for the recording medium, it is also possible to use a storage device, such as a hard disk or a RAM provided on a server system connected to a private communication network or to the Internet. Accordingly, the program may be provided to the information processing apparatus 1000 through the network.

Although the present invention has been described above by use of the preferred embodiment, it is to be noted that the technical scope of the present invention is not limited to the scope of the above-described embodiment. It is possible to apply various changes and modifications to the embodiment. It is obvious from the appended claims that such changes and modifications can be also encompassed within the technical scope of the present invention.

For example, similar to creation of the derivative ID from the user ID, the ID creating apparatus 110*a* or 110*b* may create second derivative ID out of first derivative ID. In this context, the ID resolving apparatus 150*a* or 150*b* may change the range of the personal information for reference depending on whether the request for referencing the personal information received by the ID resolving apparatus 150*a* or 150*b* is authenticated by the user ID, the first derivative ID, or the second derivative ID.

Meanwhile, the ID resolving apparatus 150*a* or 150*b* may set expiration date of the derivative ID shorter than expiration date of the user ID. In this way, the user can use the derivative ID created based on the user ID for a predetermined period of time and restrict occurrence of damages when the derivative ID is leaked during a trip, for example, which is attributable to an access to the personal information such as a bank account by use of the derivative ID during the trip.

Moreover, the ID resolving apparatus 150 possessed by any of the sites 710*a* to 710*c* may change the ceiling for deposit withdrawal or money transfer depending on whether the user has performed authentication by use of the user ID or the derivative ID. In this way, the user can provide his family member with the derivative ID and a password for the derivative ID so as to allow the family member to withdraw a deposit within a certain limit.

The identification information creating apparatus, the identification information resolving apparatus, the information system utilizing the apparatuses, the controlling method and the program thereof as defined in the following items will be achieved according to the above-described embodiment.

(Item 1) An identification information creating apparatus which creates derivative identification information being different identification information to identify a user from user identification information being original identification information to identify the user of an information system, the identification information creating apparatus includes: a derivative value creating unit for creating first and second derivative values which are mutually different data values; a user identification information encrypting unit for creating first encrypted identification information which is encrypted information including the user identification information and the first derivative value based on a predetermined encryption key and for creating second encrypted identification information which is encrypted information including the user identification information and the second derivative value based on the predetermined encryption key; and a derivative identification information creating unit for creating first and second derivative identification information based on the first and second encrypted identification information, respectively.

(Item 2) The identification information creating apparatus according to Item 1, wherein the user identification information encrypting unit includes; a hashing unit for converting the user identification information into hashed identification information having a data length shorter than a data length of the user identification information by use of a predetermined hash function; and a hashed identification information encrypting unit for creating the first encrypted identification information by encrypting information having the hashed identification information and the first derivative value based on the encryption key and for creating the second encrypted identification information by encrypting information having the hashed identification information and the second derivative value based on the encryption key.

(Item 3) The identification information creating apparatus according to Item 2, wherein the hashed identification information encrypting unit creates the first and second encrypted identification information each having the data length shorter than the data length of the user identification information, and the derivative identification information creating unit creates the first and second derivative identification information each having the same data length as the data length of the user identification information.

(Item 4) The identification information creating apparatus according to Item 1, further includes: an encryption key storage unit for storing the encryption keys corresponding to the decryption keys retained respectively by a plurality of identification information resolving apparatuses configured to judge whether the derivative identification information is created from the user identification information, wherein the user identification information encrypting unit creates the first encrypted identification information by encrypting information having the user identification information and the first derivative value based on the encryption key corresponding to the decryption key retained by one of the identification information resolving apparatuses, and the second encrypted identification information by encrypting information having the user identification information and the second derivative value based on the encryption key corresponding to the decryption key retained by one of the identification information resolving apparatuses, and the derivative identification information creating unit creates the first derivative identification information having the first encrypted identification information and an identifier for identifying the identification information creating apparatus, and creates the second derivative identification information having the second encrypted identification information and an identifier for identifying the identification information creating apparatus.

(Item 5) An identification information resolving apparatus which judges whether derivative identification information being different identification information to identify a user is created from user identification information being original identification information to identify the user, the identification information resolving apparatus includes: an encrypted identification information extracting unit for extracting encrypted identification information included in the derivative identification information, the encrypted identification information being encrypted based on a predetermined encryption key; an encrypted identification information decrypting unit for decrypting the encrypted identification information based on a decryption key corresponding to the encryption key and thereby creating decrypted identification information; and an identification information judging unit for determining that the derivative identification information is created from the user identification information when part of the decrypted identification information coincides with information created based on the user identification information.

(Item 6) The identification information resolving apparatus according to Item 5, wherein the identification information judging unit includes; a hashing unit for converting the user identification information into hashed identification information having a data length shorter than a data length of the user identification information by use of a predetermined hash function; and a derivation judging unit for determining that the derivative identification information is created from the user identification information when part of the decrypted identification information coincides with the hashed identification information.

(Item 7) The identification information resolving apparatus according to claim 5, further includes: a personal information storage unit for storing first and second personal information of the user by correlating the first and second personal information with the user identification information; a referencing request receiving unit for receiving a referencing request for referencing the personal information of the user; and a referencing request processing unit for allowing to reference the first and second personal information upon receipt of the referencing request authenticated by the user identification information, and for allowing to reference the first personal information and refusing reference to the second personal information upon receipt of the referencing request authenticated by the derivative identification information.

(Item 8) The identification information resolving apparatus according to Item 5, further includes: a decryption key storage unit for storing the decryption keys corresponding to the encryption keys retained by a plurality of identification information creating apparatus for creating the derivative identification information from the user identification information; an identification information creating apparatus identifying unit for identifying a particular one of the identification information creating apparatuses which created the derivative identification information, based on the derivative identification information, wherein the encrypted identification information extracting unit extracts the encrypted identification information which is encrypted by the particular identification information creating apparatus and is included in the derivative identification information, the encrypted identification information decrypting unit decrypts the encrypted identification information based on the decryption key corresponding to the encryption key retained by the particular identification information creating apparatus and thereby creates the decrypted identification information, and the identification information judging unit determines that the derivative identification information is created from the user identification information when part of the decrypted identification information coincides with information created based on the user identification information.

(Item 9) An identification information resolving apparatus which judges whether derivative identification information being different identification information to identify a user is created from user identification information being original identification information to identify the user, the identification information resolving apparatus includes: a derivative value creating unit for creating a derivative value being a predetermined data value; a user identification information encrypting unit for encrypting information including the user identification information and the derivative value based on a predetermined encryption key and thereby creating encrypted identification information; an expected value creating unit for creating an expected value for the derivative identification information based on the encrypted identification information; and an identification information judging unit for determining that the derivative identification information is created from the user identification information when the derivative identification information coincides with the expected value.

(Item 10) An identification information creating apparatus which creates derivative identification information being different identification information to identify a user from user identification information being original identification information to identify the user of an information system, the identification information creating apparatus includes: a derivative value creating unit for creating first and second derivative values which are mutually different data values; a user identification information encrypting unit for encrypting information including the user identification information based on a predetermined encryption key and thereby creating encrypted identification information; and a derivative identification information creating unit for creating first derivative identification information including the encrypted identification information and the first derivative value and for creating second derivative identification information including the encrypted identification information and the second derivative value.

(Item 11) An identification information resolving apparatus which judges whether derivative identification information being different identification to identify a user is created from user identification information being original identification information to identify the user, the identification information resolving apparatus includes: an encrypted identification information extracting unit for extracting encrypted identification information which is encrypted based on a predetermined encryption key, the encrypted identification information being included as part of the derivative identification information; an encrypted identification information decrypting unit for decrypting the encrypted identification information based on a decryption key corresponding to the encryption key and thereby creating decrypted identification information; and an identification information judging unit for determining that the derivative identification information is created from the user identification information when at least part of the decrypted identification information coincides with information created based on the user identification information.

(Item 12) An information system includes: identification information creating apparatus which creates derivative identification information being different identification information to identify a user from user identification information being original identification information to identify the user; and an identification information resolving apparatus which judges whether the derivative identification information is created from the user identification information, wherein the identification information creating apparatus includes: a derivative value creating unit for creating first and second derivative values which are mutually different data values; a user identification information encrypting unit for creating first encrypted identification information which is encrypted information including the user identification information and the first derivative value based on a predetermined encryption key and for creating second encrypted identification information which is encrypted information including the user identification information and the second derivative value based on the predetermined encryption key; and a derivative identification information creating unit for creating first derivative identification information based on the first encrypted identification information and for creating second derivative identification information based on the second encrypted identification information, and wherein the identification information resolving apparatus includes: an encrypted identification information extracting unit for extracting the first and second encrypted identification information included respectively in the first and second derivative identification information, the first and second encrypted identification information respectively being encrypted based on the encryption key; an encrypted identification information decrypting unit for decrypting the first and second encrypted identification information based on a decryption key corresponding to the encryption key and thereby creating first and second decrypted identification information; and an identification information judging unit for judging that the first derivative identification information is created from the user identification information when part of the first decrypted identification information coincides with information created based on the user identification information, and that the second derivative identification information is created from the user identification information when part of the second decrypted identification information coincides with information created based on the user identification information.

(Item 13) A controlling method for controlling an identification information creating apparatus which creates derivative identification information being different information to identify a user from user identification information being original identification information to identify the user of an information system, the controlling method includes: a derivative value creating step of creating first and second derivative values which are mutually different data values; a user identification information encrypting step of creating first encrypted identification information which is encrypted information including the user identification information and the first derivative value based on a predetermined encryption key and creating second encrypted identification information which is encrypted information including the user identification information and the second derivative value based on the predetermined encryption key; and a derivative identification information creating step of creating first derivative identification information based on the first encrypted identification information and creating second derivative identification information based on the second encrypted identification information.

(Item 14) A controlling method for controlling an identification information resolving apparatus which judges whether derivative identification information being different identification information to identify a user is created from user identification information being original identification information to identify the user, the controlling method includes: an encrypted identification information extracting step of extracting encrypted identification information included in the derivative identification information, the encrypted identification information being encrypted based on a predetermined encryption key; an encrypted identification information decrypting step of decrypting the encrypted identification information based on a decryption key corresponding to the encryption key and thereby creating decrypted identification information; and an identification information judging step of determining that the derivative identification information is created from the user identification information when part of the decrypted identification information coincides with information created based on the user identification information.

(Item 15) A controlling method for controlling an identification information resolving apparatus which judges whether derivative identification information being different information to identify a user is created from user identification information being original identification information to identify the user, the controlling method includes: a derivative value creating step of creating a derivative value which is a predetermined data value; a user identification information encrypting step of encrypting information including the user identification information and the derivative value based on a predetermined encryption key and thereby creating encrypted identification information; an expected value creating step of creating an expected value for the derivative identification information based on the encrypted identification information; and an identification information judging step of determining that the derivative identification information is created from the user identification information when the derivative identification information coincides with the expected value.

(Item 16) A program for allowing an information processing apparatus to function as an identification information creating apparatus which creates derivative identification information being different identification information to identify a user from user identification information being original identification information to identify the user of an information system, the program allowing the information processing apparatus to function as: a derivative value creating unit for creating first and second derivative values which are mutually different data values; a user identification information encrypting unit for creating first encrypted identification information which is encrypted information including the user identification information and the first derivative value based on a predetermined encryption key and creating second encrypted identification information which is encrypted information including the user identification information and the second derivative value based on the predetermined encryption key; and a derivative identification information creating unit for creating first derivative identification information based on the first encrypted identification information and creating second derivative identification information based on the second encrypted identification information.

(Item 17) A program for allowing an information processing apparatus to function as an identification information resolving apparatus which judges whether derivative identification information being different identification information to identify a user is created from user identification information being original identification information to identify the user, the program allowing the information processing apparatus to function as: an encrypted identification information extracting unit for extracting encrypted identification information included in the derivative identification information, the encrypted identification information being encrypted based on a predetermined encryption key; an encrypted identification information decrypting unit for decrypting the encrypted identification information based on a decryption key corresponding to the encryption key and thereby creating decrypted identification information; and an identification information judging unit for determining that the derivative identification information is created from the user identification information when part of the decrypted identification information coincides with information created based on the user identification information.

(Item 18) A program for allowing an information processing apparatus to function as an identification information resolving apparatus which judges whether derivative identification information being different identification information to identify a user is created from user identification information being original identification information to identify the user, the program allowing the information processing apparatus to function as: a derivative value creating unit for creating a derivative value which is a predetermined data value; a user identification information encrypting unit for encrypting information including the user identification information and the derivative value based on a predetermined encryption key and thereby creating encrypted identification information; an expected value creating unit for creating an expected value for the derivative identification information based on the encrypted identification information; and an identification information judging unit for determining that the derivative identification information is created from the user identification information when the derivative identification information coincides with the expected value.

(Item 19) A recording medium recording any one of the programs according to claims 16 to 18.

As apparent from the foregoing description, the present invention can provide the identification information creating apparatus and the identification information resolving apparatus, which are capable of imparting a connection between user ID and derivative ID which is different ID for identifying a user and of creating and utilizing the derivative ID configured to prohibit identification of the connection between the user ID and the derivative ID by an unauthorized server or the like.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent aspects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Although the preferred embodiments of the present invention have been described in detail, it should be understood that various changes, substitutions and alternations can be made therein without departing from spirit and scope of the inventions as defined by the appended claims.

The invention claimed is:

1. An apparatus for creating derivative identification information from original user identification information received from a user terminal, the apparatus comprising:
    at least one identification (ID) creating apparatus disposed to be receptive of the original user identification information from the user terminal, the at least one ID creating apparatus including a storage unit on which an encryption key is registered and the at least one ID creating apparatus further including:
    a derivative value creating unit for creating at least one of a first derivative value and a second derivative value which is different than the first derivative value, wherein the first and second derivative values are based either on a predetermined sequence of numbers or on random numbers;
    a user identification information encrypting unit, coupled to the derivative value creating unit, for at least one of: (i) creating a first encrypted identification information, which is encrypted information including the original user identification information and the first derivative value, based on the encryption key, the encryption key corresponding to a decryption key retained by a judging apparatus configured to judge whether the derivative identification information is created from the user identification information and, if the second derivative value is present, (ii) creating a second encrypted identification information, which is encrypted information including the original user identification information and the second derivative value, based on the encryption key corresponding to the decryption key retained by the judging apparatus configured to judge whether the derivative identification information is created from the user identification information, the user identification information encrypting unit not creating the second encrypted identification information if the second derivative value is not present; and
    a derivative identification information creating unit, coupled to the user identification information encrypting unit, for at least one of: (i) creating a first derivative identification information based on the first encrypted identification information and transmitting the first derivative identification information to the user terminal and, if the second encrypted identification information is present, (ii) creating a second derivative identification information based on the second encrypted identification information and transmitting the second derivative identification information to the user terminal, the derivative identification information creating unit not creating the second derivative identification information if the second encrypted identification information is not present.

2. The apparatus according to claim 1, wherein the user identification information encrypting unit comprises:
    a hashing unit for converting the original user identification information into hashed identification information having a data length shorter than a data length of the original user identification information by use of a predetermined hash function; and
    a hashed identification information encrypting unit for creating (i) the first encrypted identification information, which is encrypted information including the hashed identification information and the first derivative value, based on the encryption key corresponding to the decryption key retained by the judging apparatus configured to judge whether the derivative identification information is created from the original user identification information and, if the second derivative value is present, for (ii) creating the second encrypted identification information, which is encrypted information including the hashed identification information and the second derivative value, based on the encryption key corresponding to the decryption key retained by the judging apparatus configured to judge whether the derivative identification information is created from the original user identification information, the hashed identification information encrypting unit not creating the second encrypted identification information if the second derivative value is not present.

3. The apparatus according to claim 2,
    wherein the hashed identification information encrypting unit creates the first and second encrypted identification information each having the data length shorter than the data length of the original user identification information; and
    wherein the derivative identification information creating unit creates the first and second derivative identification information each having the same data length as the data length of the original user identification information.

4. The apparatus according to claim 1, further comprising:
    an encryption key storage unit for storing the encryption keys corresponding to the decryption keys retained respectively by a plurality of identification information resolving apparatuses configured to judge whether the derivative identification information is created from the original user identification information.

5. The apparatus according to claim 1, wherein the derivative identification information creating unit includes an identifier for identifying the apparatus in the first derivative identification information and, only in an event the second derivative identification information is created, includes the identifier in the second derivative identification information.

6. A method of creating derivative identification information from user identification information for use with a system, the system including a user terminal at which the user identification information is generated and at least one identification (ID) creating apparatus disposed to be receptive of the user identification information from the user terminal, the at least one ID creating apparatus including a storage unit on which an encryption key is registered, the method comprising the steps of:
    creating, at a derivative value creating unit of the at least one ID creating apparatus, at least one of a first derivative value and a second derivative value which is different than the first derivative value, wherein the derivative values are based either on a predetermined sequence of numbers or on random numbers;
    creating, at a user identification information encrypting unit coupled at the at least one ID creating apparatus to the derivative value creating unit, a first encrypted identification information, which is encrypted information including the user identification information and the first derivative value, based on the encryption key, the encryption key corresponding to a decryption key retained by a judging apparatus configured to judge whether the derivative identification information is created from the user identification information;

if the second derivative value is present, creating a second encrypted identification information at the user identification information encrypting unit, which is encrypted information including the user identification information and the second derivative value, based on the encryption key corresponding to the decryption key retained by the judging apparatus configured to judge whether the derivative identification information is created from the user identification information and, if the second derivative value is not present, not creating the second encrypted identification information;

creating, at a derivative identification information creating unit coupled at the at least one ID creating apparatus to the user identification information encrypting unit, a first derivative identification information based on the first encrypted identification information and transmitting the first derivative identification information to the user terminal; and if the second encrypted identification information is present, creating a second derivative identification information at the derivative identification information creating unit based on the second encrypted identification information and transmitting the second derivative identification information to the user terminal and, if the second encrypted identification information is not present, not creating a second derivative identification information.

7. A non-transitory computer readable storage medium having executable computer readable program code stored thereon for causing, when executed, the at least one ID creating apparatus to create the derivative identification information from the user identification information according to the steps of claim 6.

* * * * *